(12) United States Patent
Nihoshi et al.

(10) Patent No.: US 6,906,859 B2
(45) Date of Patent: Jun. 14, 2005

(54) EPI-ILLUMINATION APPARATUS FOR FLUORESCENT OBSERVATION AND FLUORESCENCE MICROSCOPE HAVING THE SAME

(75) Inventors: Toshiaki Nihoshi, Yokohama (JP); Hisashi Okugawa, Kanagawa (JP)

(73) Assignee: Nikon Corporation, Tokyo (JP)

( * ) Notice: Subject to any disclaimer, the term of this patent is extended or adjusted under 35 U.S.C. 154(b) by 97 days.

(21) Appl. No.: 10/453,660

(22) Filed: Jun. 4, 2003

(65) Prior Publication Data

US 2003/0227674 A1 Dec. 11, 2003

(30) Foreign Application Priority Data

Jun. 5, 2002 (JP) ........................................ 2002-164633
Jun. 10, 2002 (JP) ........................................ 2002-168386

(51) Int. Cl.$^7$ ............................................. G02B 21/06
(52) U.S. Cl. ..................... 359/389; 359/368; 250/458.1
(58) Field of Search ................................. 359/368, 370, 359/371, 381, 385, 388, 389; 250/458.1, 459.1

(56) References Cited

U.S. PATENT DOCUMENTS

| | | |
|---|---|---|
| 5,371,624 A | 12/1994 | Nagano et al. |
| 5,710,663 A | 1/1998 | Kawasaki |
| 6,025,956 A * | 2/2000 | Nagano et al. ............. 359/386 |
| 6,262,837 B1 * | 7/2001 | Nagano et al. ............. 359/368 |
| 6,747,280 B1 * | 6/2004 | Weiss ....................... 250/458.1 |

* cited by examiner

Primary Examiner—Mark A. Robinson

(57) ABSTRACT

An epi-illumination apparatus for fluorescent observation, adjusting light intensities of a plurality of illuminations on a sample over a wide wavelength band continuously and being configured inexpensively, and a fluorescence microscope having the same are provided. A light source, extracting means, an aperture stop, and a filter are arranged on a predetermined optical axis. The aperture stop is arranged on a plane generally conjugated with a pupil plane of an objective. The filter is placed near the aperture stop. The extracting means extracts a plurality of narrow wavelength bands from the wavelength band of the illumination emitted from the light source. The filter has regions of different spectral transmission characteristics to the narrow wavelength bands. The adjusting means for adjusting light intensities of transmitted light from the filter in the narrow wavelength bands independently by moving the filter in a direction orthogonal to the optical axis is provided.

8 Claims, 26 Drawing Sheets

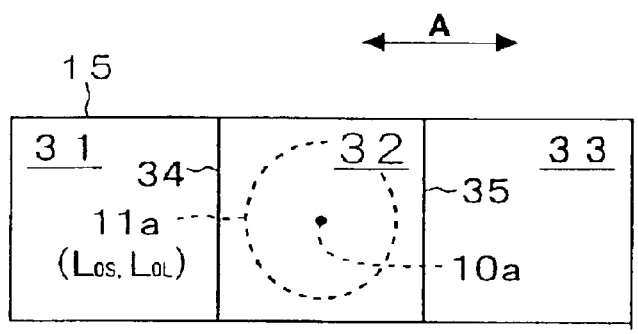
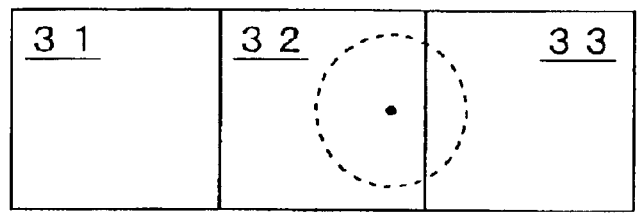
Fig. 3E
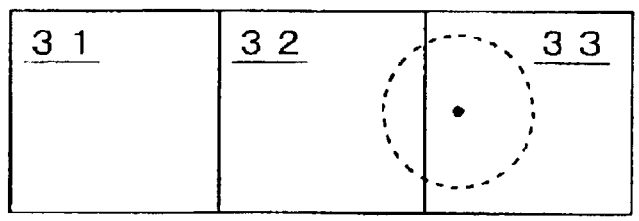
Fig. 3F
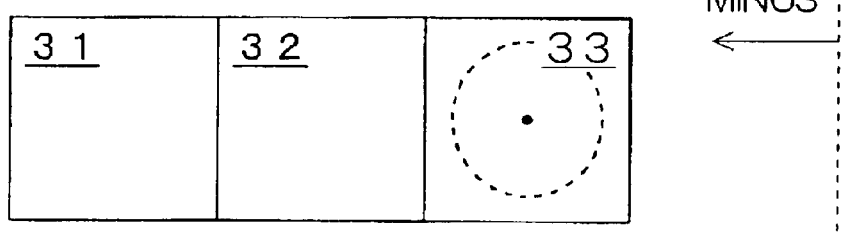
Fig. 3G

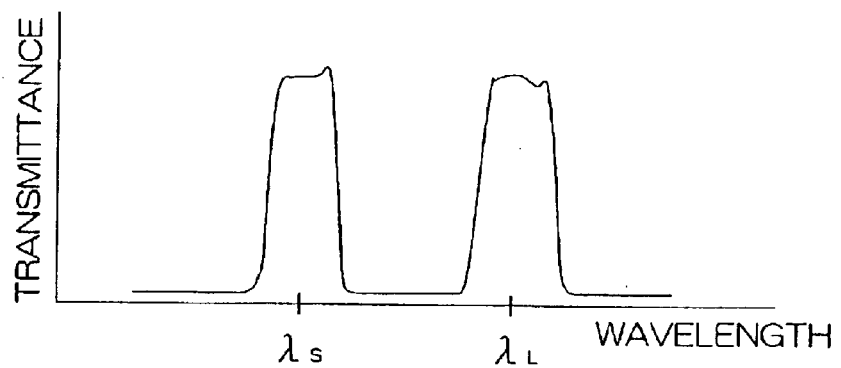
Fig. 4
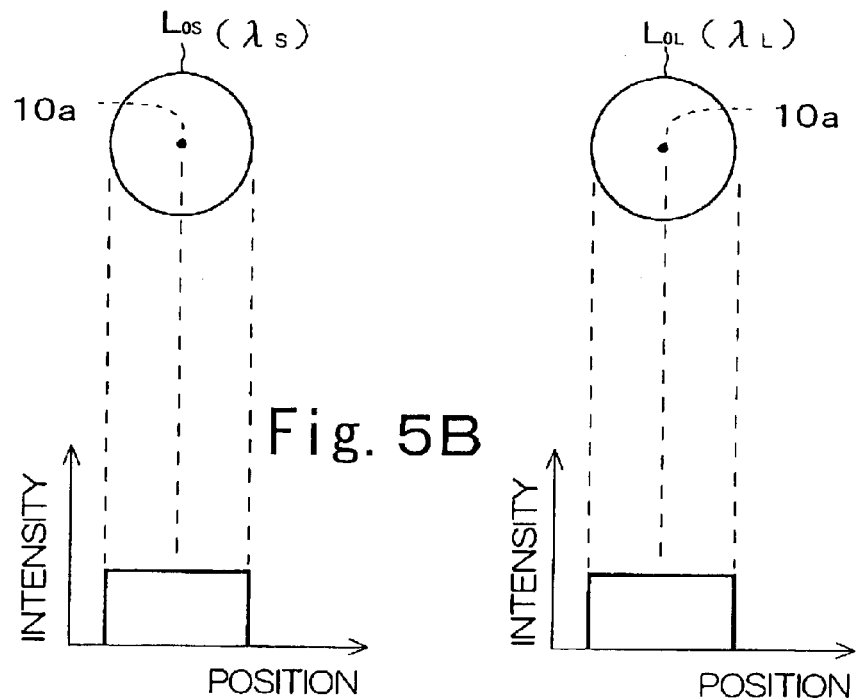
Fig. 5A
Fig. 5B

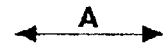
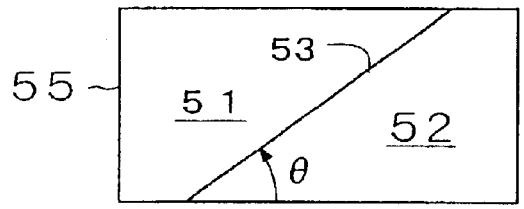
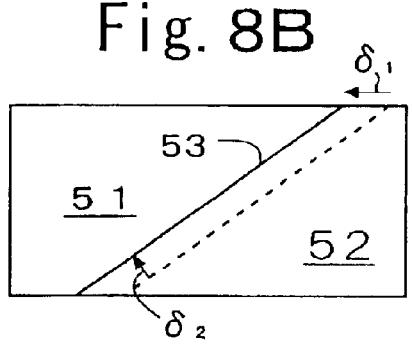
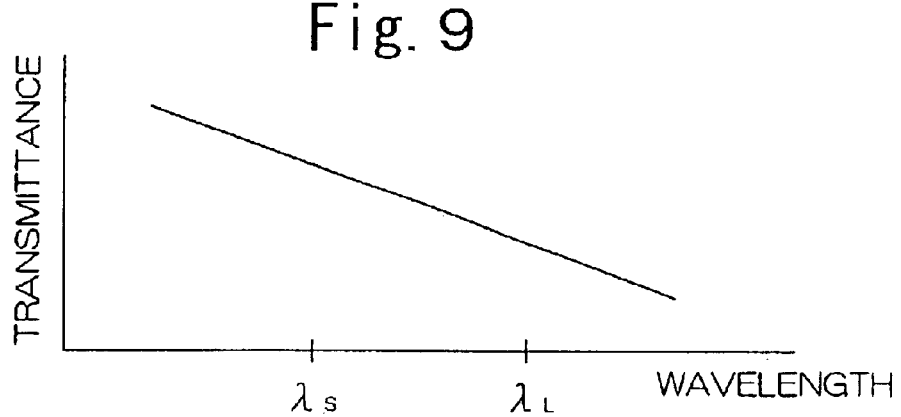

EPI-ILLUMINATION APPARATUS FOR FLUORESCENT OBSERVATION AND FLUORESCENCE MICROSCOPE HAVING THE SAME

CROSS REFERENCE TO RELATED APPLICATIONS

This application is based upon and claims the benefit of Japanese Patent Application No. 2002-164633, filed on Jun. 5, 2002, and Japanese Patent Application No. 2002-168386, filed on Jun. 10, 2002, the entire contents of which are incorporated herein by reference.

BACKGROUND OF THE INVENTION

1. Field of the Invention

The present invention relates to an epi-illumination apparatus for fluorescent observation and a fluorescence microscope having the same. In particular, the present invention relates to an epi-illumination apparatus for fluorescent observation for illuminating a sample that is marked with a plurality of fluorescence materials, and a fluorescence microscope having the same.

2. Description of the Related Art

Conventionally, fluorescent observations of a sample marked with a plurality of fluorescence materials have been conducted by using a fluorescence microscope or the like. The plurality of fluorescence materials adheres to respective different regions of the sample. Thus, based on the fluorescence occurring from the respective fluorescence materials, a fluorescence image of the sample can be captured to observe the plurality of different regions of the sample marked with the plurality of fluorescence materials simultaneously.

By the way, in order for respective fluorescence materials in a sample to produce fluorescence, the respective fluorescence materials must be excited by illuminations in appropriate narrow wavelength bands. The narrow wavelength bands of the illuminations appropriate for the respective fluorescence materials are typically different from each other. When the sample marked with a plurality of fluorescence materials is under fluorescent observation, the sample is thus irradiated with a plurality of illuminations of different narrow wavelength bands. Such a plurality of illuminations is usually generated by an excitation filter which transmits light in a plurality of predetermined, different narrow wavelength bands.

In general, fluorescence materials differ from each other in fluorescence efficiency (the ratio of the light intensity of fluorescence to the light intensity of illumination). Thus, when the sample is irradiated with a plurality of illuminations (in different narrow wavelength bands) of the same light intensities, the respective fluorescence materials produce fluorescence of different light intensities.

Then, the fluorescence image of the sample captured under the circumstances can show brighter images at regions where fluorescence materials of higher fluorescence efficiencies adhere to and darker images at regions where fluorescence materials of lower fluorescence efficiencies are adhere to. Such a mixture of brighter images and darker images in the fluorescence image of the sample makes it difficult to obtain a picture suited for fluorescent observation.

Consequently, in order to equalize the light intensities of the fluorescence occurring from the respective fluorescence materials of the sample, there has been proposed the method of adjusting the light intensity of plurality of illuminations for the sample to be irradiated with. For example, Japanese Patent No. 3093009 describes that an interference filter is arranged in the optical path of the illuminations between the light source and the excitation filter, and a rotating mechanism is provided to adjust the angle of incidence of the entrance beam to this interference filter.

In this configuration example, the spectrum of the illumination transmitted through the interference filter shifts and the spectrum of the illumination incident to the excitation filter shifts, by varying the rotation angle of the interference filter. As a result, a plurality of illuminations (in different narrow wavelength bands) generated by the excitation filter can be adjusted in light intensity.

In another method proposed, a plurality of interference filters having different transmission wavelength bands are prepared in advance. Any one of the interference filters is selectively put in the optical path of the illumination (between the light source and the excitation filter) according to the narrow wavelength band of the excitation filter, so that the spectrum of the illumination is modified to adjust the plurality of illuminations in the light intensity on the sample.

In the foregoing method of rotating an interference filter, however, the spectrum of the illumination transmitted through the interference filter can only be shifted within a small range. Thus, there has been the problem that the wavelength band allowing adjustments to the light intensities of the plurality of illuminations is narrow. In addition, each time the excitation filter is replaced with one having a different narrow wavelength band, the interference filter must also be replaced with another that has the range of shift suitable to the narrow wavelength band of the excitation filter. This means complicated operations and higher costs.

Moreover, in the foregoing method of switching interference filters, it is impossible to adjust the light intensities of the plurality of illuminations continuously. A single excitation filter requires a plurality of interference filters, which cause an increase in cost.

SUMMARY OF THE INVENTION

In view of the foregoing, it is an object of the present invention to provide an epi-illumination apparatus for fluorescent observation capable of adjusting the light intensities of a plurality of illuminations on a sample over a wide wavelength band continuously, and to provide a fluorescence microscope including the same.

An epi-illumination apparatus for fluorescent observation according to the present invention includes: a light source for emitting illumination, being arranged on a predetermined optical axis; extracting means for extracting a plurality of narrow wavelength bands from a wavelength band of the illumination, the extracting means being arranged on the optical axis; an aperture stop arranged on the optical axis, and on a plane generally conjugated with a pupil plane of an objective; a filter having regions of different spectral transmission characteristics with respect to the plurality of narrow wavelength bands, the filter being arranged near the aperture stop on the optical axis; and adjusting means for adjusting light intensities of transmitted light from the filter in the plurality of narrow wavelength bands independently by moving the filter in a direction orthogonal to the optical axis.

According to this epi-illumination apparatus, the sample can be excited by the illuminations in the plurality of narrow wavelength bands. In addition, balance in light intensity of the illuminations in the plurality of narrow wavelength bands can be adjusted easily by simply moving the filter in the direction orthogonal to the optical axis. The balance in light intensity of the illuminations in the plurality of narrow wavelength bands depends on the spectral transmission characteristics in the region of the filter on the optical axis.

Here, the filter may include a plurality of zones adjacent to each other sectioned by one or more boundaries which cross the direction of movement of the filter. The spectral transmission characteristics of adjacent zones out of the plurality of zones may differ from each other. In this case, the adjusting means adjusts the light intensities independently by moving the filter so that the transmitted light varies in at least either areas of sections of light in the plurality of narrow wavelength bands or intensity distributions in the sections of the light.

In the filter that includes the plurality of zones adjacent to each other between which one or more boundaries cross the direction of movement, the one or more boundaries of the plurality of zones are formed in an aslant direction to the direction of movement of the filter.

Moreover, the spectral transmission characteristics of the filter may vary continuously along the direction of movement of the filter. In this case, the adjusting means adjusts the light intensities independently by moving the filter to vary the transmitted light in spectrum.

The filter in which the spectral transmission characteristics vary continuously along the direction of movement has notch-like spectral transmission characteristics capable of blocking a specific narrow wavelength band and transmitting the rest of wavelength bands. The specific narrow wavelength band varies continuously along the direction of movement.

Furthermore, when the filter varies continuously in the spectral transmission characteristics, the aperture stop has an opening of variable size as to the direction of movement. The adjusting means adjusts the light intensities independently by varying the size of the opening to vary the transmitted light in spectrum.

A fluorescence microscope according to the present invention is intended for use in fluorescent observation of a sample marked with a plurality of fluorescence materials, including: the epi-illumination apparatus for fluorescent observation described above; and an imaging optical system for collecting fluorescence from the sample to form a fluorescence image of the sample, the imaging optical system including the objective.

As above, the epi-illumination apparatus for fluorescent observation according to the present invention can adjust the light intensities of a plurality of illuminations on a sample over a wide wavelength band continuously, and can be formed inexpensively. The fluorescence microscope according to the present invention can equalize the light intensities of fluorescence occurring from respective fluorescence materials of a sample for favorable fluorescent observation.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3(A) is a diagram for explaining the physical relationship between the light intensity balance filter 15 and a light source image 11a;

FIG. 3(E) is a diagram for explaining the same physical relationship as that of FIG. 3(A);

FIG. 3(F) is a diagram for explaining the same physical relationship as that of FIG. 3(A);

FIG. 3(G) is a diagram for explaining the same physical relationship as that of FIG. 3(A);

FIG. 4 is a chart for explaining the spectral characteristics of an excitation filter 18;

FIG. 5(A) is a diagram for explaining the sectional configurations of illuminations $L_{OS}$ and $L_{OL}$ which are incident on the light intensity balance filter 15;

FIG. 5(B) is a chart for explaining intensity distributions in the sections of FIG. 5(A);

FIG. 8(A) is a diagram for explaining zones 51 and 52 of another light intensity balance filter 55;

FIG. 8(B) is a diagram for explaining a displacement $\delta_1$ of the light intensity balance filter 55 and an actual displacement $\delta_2$ of a boundary 53;

FIG. 9 is a chart for explaining the spectral characteristics of another short wave transmission zone;

DESCRIPTION OF THE PREFERRED EMBODIMENTS

Hereinafter, embodiments of the present invention will be described in detail with reference to the drawings.
(First Embodiment)

Figure 1:
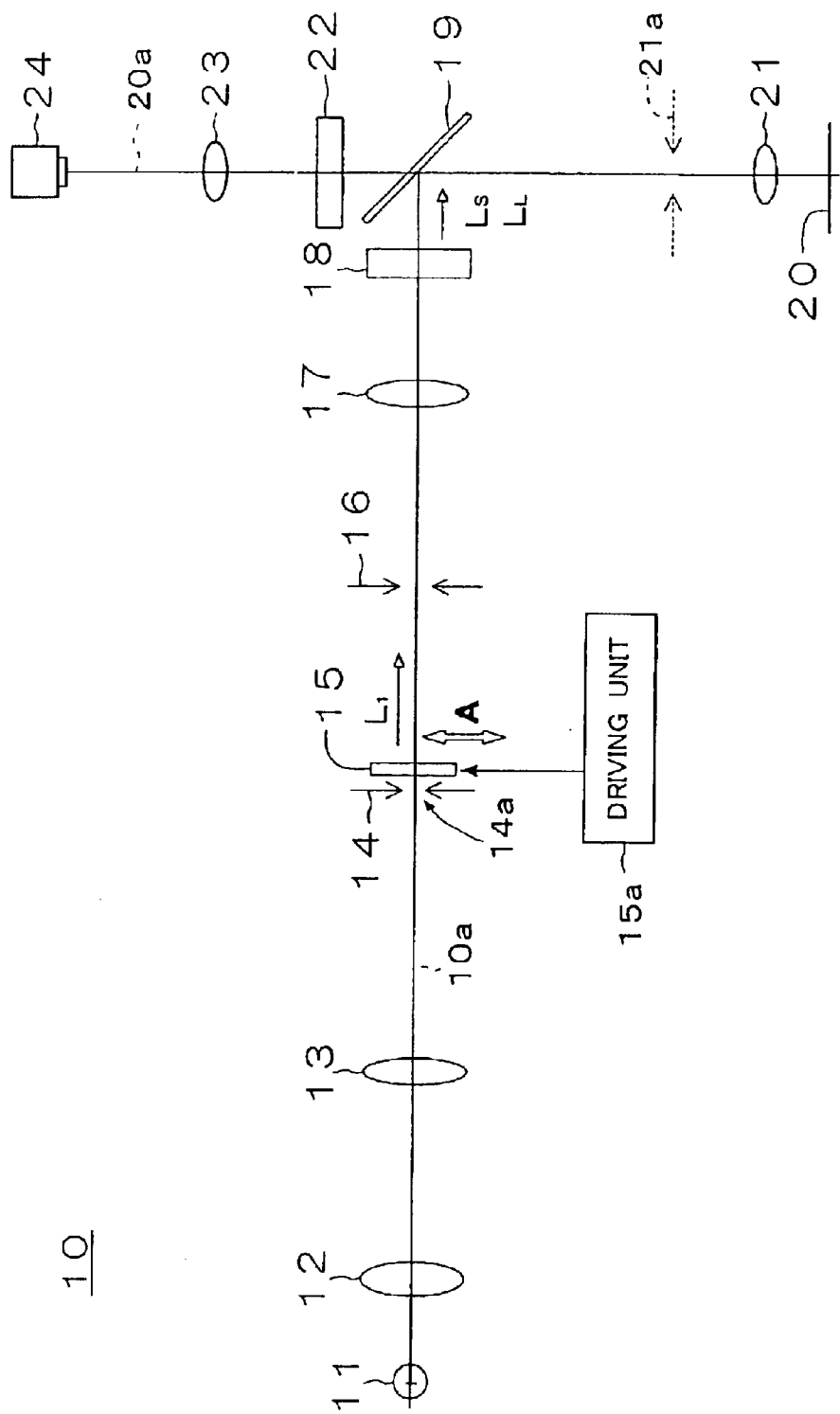
FIG. 1 is an overall block diagram of a fluorescence microscope 10 and its epi-illumination apparatus (11–19)

A first embodiment of the present invention will deal with an example of an epi-illumination apparatus (11–19) which is built in a fluorescence microscope 10 to be used in fluorescent observation of a sample 20 and illuminates the sample 20 as shown in FIG. 1.

Aside from the epi-illumination apparatus (11–19) for fluorescent observation, the fluorescence microscope 10 has an observation system (21–24). Initially, description will be given of the sample 20, a subject to be observed. Then, the observation system (21–24) of the fluorescence microscope 10 will be described briefly, followed by detailed description of the epi-illumination apparatus (11–19).

The sample 20 is a living sample (such as DNA and protein) which is marked with two types of fluorescence materials, for example. When illuminated by the epi-illumination apparatus (11–19), the two types of fluorescence materials are individually excited to produce two types of fluorescence. In the following description, the narrow wavelength band suitable for the excitation of one of the fluorescence materials in the sample 20 will be denoted as "$\lambda_S$", and the narrow wavelength band suitable for the excitation of the other fluorescence material as "$\lambda_L$" ($\lambda_S < \lambda_L$). Incidentally, the fluorescence occurs in all directions irrespective of the direction of illumination.

The observation system (21–24) includes an objective 21 of an afocal system, a barrier filter 22, an imaging lens 23 to function as a second objective, and a camera 24, which are arranged along an optical axis 20a in order from the sample 20. The barrier filter 22 is a wavelength selection filter having the characteristic of selectively transmitting the wavelength bands of two types of fluorescence occurring from the sample 20.

When the sample 20 is under fluorescent observation, the two types of fluorescence occurring from the sample 20 are incident on the camera 24 through the objective 21, a dichroic mirror 19 to be described later, the barrier filter 22, and the imaging lens 23, and are collected to the shooting surface of the camera 24 by the action of the objective 21 and the imaging lens 23. Here, a fluorescence image of the sample 20 based on the two types of fluorescence is formed on the shooting surface of the camera 24. The fluorescence image on the shooting surface is shot by the camera 24 and captured as a fluorescence picture of the sample 20.

Next, description will be given of the epi-illumination apparatus (11–19) of the present embodiment.

The epi-illumination apparatus (11–19) includes a light source 11, a collector lens 12, an imaging lens 13, an aperture stop 14, a light intensity balance filter 15, a field stop 16, a field lens 17, an excitation filter 18, and a dichroic mirror 19, which are arranged along an optical axis 10a in order. A driving unit 15a is connected to the light intensity balance filter 15.

The epi-illumination apparatus (11–19) is built in between the objective 21 and the barrier filter 22 of the observation system (21–24) described above, with the optical axis 10a generally orthogonal to the optical axis 20a of the observation system (21–24). Here, the dichroic mirror 19 of the epi-illumination apparatus (11–19) is arranged on the optical axis 20a.

When the sample 20 is under fluorescent observation, illumination from the light source 11 is generally transmitted through the collector lens 12, the imaging lens 13, the aperture stop 14, the light intensity balance filter 15, the field stop 16, the field lens 17, and the excitation filter 18, and is reflected by the dichroic mirror 19, being introduced onto the optical axis 20a of the observation system (21–24). Then, the illumination is irradiated onto the sample 20 after passing through the objective 21. Thus, the epi-illumination apparatus (11–19) is configured to illuminate the sample 20 through the objective 21.

In the epi-illumination apparatus (11–19) of the present embodiment, a reference plane generally conjugated with a pupil plane 21a of the objective 21 is defined by the field lens 17 to fall between the light source 11 and the excitation filter 18. The aperture stop 14 and the light intensity balance filter 15 are closely arranged in the vicinity of the reference plane. Incidentally, the pupil plane 21a of the objective 21 is also referred to as an entrance pupil plane or rear focal plane.

The light source 11 is a high intensity light source such as a mercury lamp. It emits ultraviolet rays, visible light, or other illumination (illumination in a wavelength band that covers two narrow wavelength bands $\lambda_S$ and $\lambda_L$ suitable for the excitation of the two types of fluorescence materials in the sample 20) toward the collector lens 12 on the side of the objective 21. The collector lens 12 and the imaging lens 13 collect the illumination from the light source 11 to form a light source image near the aperture stop 14 and the light intensity balance filter 15 (near the reference plane generally conjugated with the pupil plane 21a of the objective 21).

The aperture stop 14 has a circular opening 14a which is centered to the optical axis 10a of the epi-illumination apparatus (11–19). The present embodiment will be described on the assumption that the light source image mentioned above has the same size and shape as those of the opening 14a in the aperture stop 14. The opening 14a has a size of around 3 to 5 mm, for example.

Since the aperture stop 14 and the light intensity balance filter 15 are sufficiently close to each other, the illumination incident on the surface of the light intensity balance filter 15 facing the aperture stop 14 may also be considered to have the same size and shape as those of the opening 14a of the aperture stop 14 (i.e., the same as those of the light source image). For this reason, in the following description, the section of the illumination upon the incidence on the surface of the light intensity balance filter 15 facing the aperture stop 14 will be referred to as "light source image".

Now, description will be given of the light intensity balance filter 15. The light intensity balance filter 15 is an interference filter which is fabricated by applying coatings to one of the surfaces of a single glass substrate (the surface facing the aperture stop 14). This light intensity balance filter 15 is situated in the optical path of the illumination.

Figure 2A:
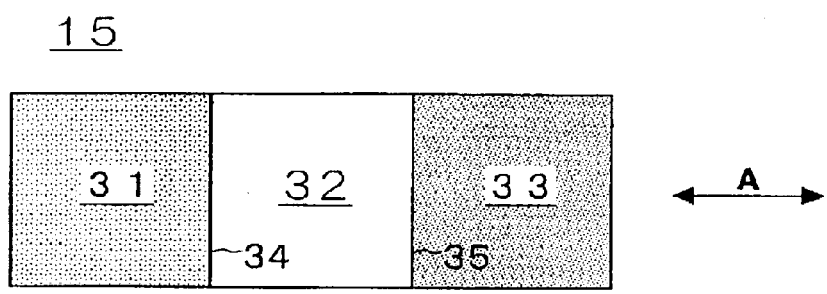
FIG. 2(A) is a diagram for explaining zones 31–33 of a light intensity balance filter 15.

Besides, as shown in FIG. 2(A), the light intensity balance filter 15 has three zones 31, 32, and 33 which are arranged along one direction (A). FIG. 2(A) is a view of the light intensity balance filter 15 as taken in the direction of the optical axis 10a. The one direction (A) is perpendicular to the direction of the optical axis 10a, crossing the optical path of the illumination.

Among these three zones 31–33, the zones 31 and 33 on both sides are ones given the coatings mentioned above. The central zone 32 is an unmodified zone of the glass substrate with no coating. Of the three zones 31–33, adjacent ones (the zones 31 and 32) (the zones 32 and 33) differ from each other in spectral transmittance characteristics.

Furthermore, in the present embodiment, the zones 31 and 33 on both sides are coated differently (for example, in material, thickness, etc.). Thus, the zones 31 and 33 on both sides also differ from each other in spectral transmittance characteristics. That is, the light intensity balance filter 15 is allocated to the three zones 31–33 having different spectral transmittance characteristics. The spectral transmittance characteristics of the zones 31–33 are uniform within the respective zones 31–33.

The spectral transmittance characteristics is spectral characteristics that the light in a certain wavelength band shows upon being transmitted through the zones 31–33 of the light intensity balance filter 15 (wavelength characteristics in transmittance). Differing in spectral transmittance characteristics means that there is a difference between the transmittances for at least two narrow wavelength bands $\lambda_S$ and $\lambda_L$ (the narrow wavelength bands suitable for the excitation of the two types of fluorescence materials in the sample 20). Hereinafter, the spectral transmittance characteristics will be referred to simply as "spectral characteristics".

Figure 2B:
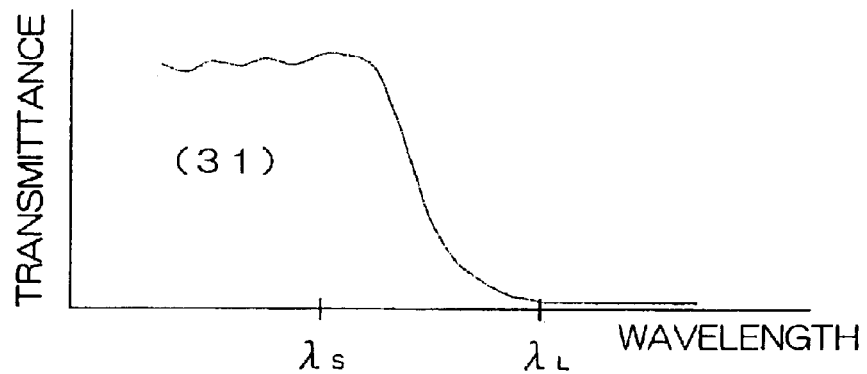
FIG. 2(B) is a chart for explaining the spectral characteristics of the zone 31.

A concrete example will now be given of the spectral characteristics of the zones 31, 32, and 33 of the light intensity balance filter 15. The zone 31 has spectral characteristics as shown in FIG. 2(B), or such that a critical wavelength is established between the narrow wavelength bands $\lambda_S$ and $\lambda_L$ suitable for the excitation of the two types of fluorescence materials in the sample 20 so as to transmit a wavelength band shorter than the critical wavelength (the side including the narrow wavelength band $\lambda_S$) and block a band of longer wavelength (the side including the narrow wavelength band $\lambda_L$).

Figure 2C:
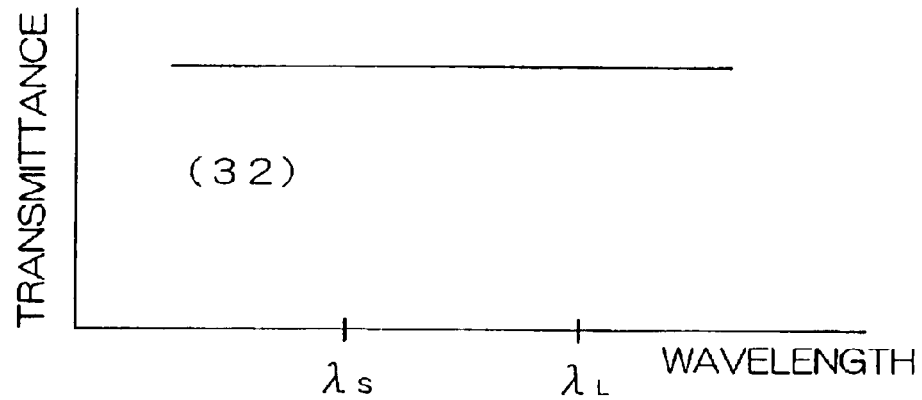
FIG. 2(C) is a chart for explaining the spectral characteristics of the zone 32.
Figure 2D:
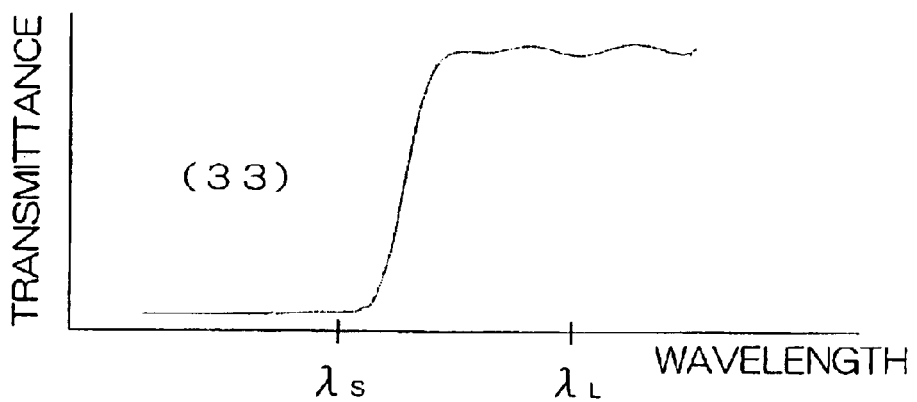
FIG. 2(D) is a chart for explaining the spectral characteristics of the zone 33.

The zone 32 has spectral characteristics as shown in FIG. 2(C), or such that the entire wavelength band including the two narrow wavelength bands $\lambda_S$ and $\lambda_L$ is transmitted. The zone 33 has spectral characteristics as shown in FIG. 2(D), or such that a critical wavelength is established between the two narrow wavelength bands $\lambda_S$ and $\lambda_L$ so as to transmit a wavelength band longer than the critical wavelength (the side including the narrow wavelength band $\lambda_L$) and block a band of shorter wavelength (the side including the narrow wavelength band $\lambda_S$).

In the light intensity balance filter 15, the boundary 34 between the zones 31 and 32 and the boundary 35 between the zones 32 and 33 are both formed perpendicularly to the direction of arrangement of the zones 31–33 (i.e., the one direction (A)).

Moreover, in the present embodiment, the light intensity balance filter 15 described above is connected with the driving unit 15a (FIG. 1). This driving unit 15a can be manually operated to slide the light intensity balance filter 15 along the one direction (A). The one direction (A) is orthogonal to the optical axis 10a.

When the driving unit 15a is operated to slide the light intensity balance filter 15 in the one direction (A), the position of incidence of the illumination from the aperture stop 14 on the light intensity balance filter 15 varies relatively along the one direction (A). Then, as shown in FIGS. 3(A) to 3(G), the position of the light source image 11a on the light intensity balance filter 15 also varies relatively along the one direction (A). FIGS. 3(A) to 3(G) are views of the light source image 11a and the light intensity balance filter 15 as taken in the direction of the optical axis 10a.

Figure 3A:
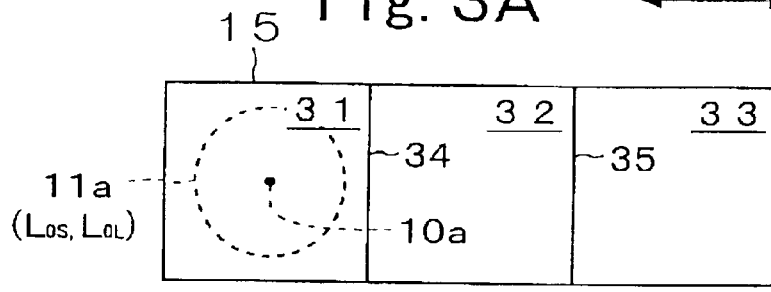

The illumination incident on the light intensity balance filter 15 is transmitted, for example, through the zone 31 alone (illumination $L_1$ in FIG. 1) according to the position of the light source image 11a shown in FIG. 3(A), and travels to the field stop 16 in the subsequent stage. The light intensity balance filter 15 can also be slid in the one direction (A) to vary the position of the light source image 11a to any of FIGS. 3(B) to 3(G), allowing the transmission through both the zones 31 and 32, the zone 32 alone, both the zones 32 and 33, or the zone 33 alone (to be described later).

Incidentally, the illumination $L_1$ having been transmitted through at least one of the zones 31–33 of the light intensity balance filter 15 has the same wavelength band as that of the illumination yet to be incident on the light intensity balance filter 15. That is, the light intensity balance filter 15 causes no change in the wavelength band of the illumination $L_1$. As will be detailed later, the light intensity balance filter 15 is a filter for adjusting the balance in light intensity of the illumination, not for adjusting the wavelength band of the illumination.

The illumination $L_1$ having been transmitted through the light intensity balance filter 15 is incident on the field lens 17 through the field stop 16 (FIG. 1). The field stop 16 is arranged on a plane conjugated with both the sample 20 and the shooting surface of the camera 24, and defines the field of view (range of illumination) of the sample 20.

The field lens 17, as described previously, is an optical system for defining the reference plane generally conjugated with the pupil plane 21a of the objective 21. The illumination $L_1$ from the light intensity balance filter 15 arranged near the reference plane is thus collected to the pupil plane 21a of the objective 21 by the action of the field lens 17.

Note that before the illumination transmitted through the field lens 17 is introduced onto the optical axis 20a of the observation system (21–24), or while it proceeds on the optical axis 10a of the epi-illumination apparatus (11–19), it is transmitted through the excitation filter 18. This excitation filter 18 is a filter for transmitting illumination in two predetermined, different narrow wavelength bands $\lambda_S$ and $\lambda_L$ as shown in FIG. 4.

One of the two narrow wavelength bands $\lambda_S$ and $\lambda_L$ of the excitation filter 18 is, as mentioned previously, a wavelength band suitable for the excitation of either one of the fluorescence materials in the sample 20. The other of the two narrow wavelength bands $\lambda_S$ and $\lambda_L$ is one suitable for the excitation of the other fluorescence material in the sample 20.

The illumination incident on the excitation filter 18 has the same wavelength band as that of the illumination $L_1$ which has been transmitted through the light intensity balance filter 15 described above. That is, the field lens 17 causes no change in the wavelength band of the illumination. Thus, the excitation filter 18 simultaneously extracts the two narrow wavelength bands $\lambda_S$ and $\lambda_L$ alone (FIG. 4) from the wavelength band of the illumination $L_1$.

Consequently, the illumination transmitted through the excitation filter 18 contains two illuminations $L_S$ and $L_L$ having the different narrow wavelength bands $\lambda_S$ and $\lambda_L$. The two illuminations $L_S$ and $L_L$ are part of the illumination $L_1$ that is incident on the excitation filter 18. Then, the two illuminations $L_S$ and $L_L$ are collected to the pupil plane of the objective 21, and irradiated onto the field of view of the sample 20 after passing through the objective 21.

Incidentally, the dichroic mirror 19 arranged in the subsequent stage of the excitation filter 18 has the spectral characteristics capable of reflecting the illuminations $L_S$ and $L_L$ in the two narrow wavelength bands $\lambda_S$ and $\lambda_L$ past the excitation filter 18 and transmitting two types of fluorescence occurring from the sample 20.

In the field of view of the sample 20, one of the fluorescence materials is excited by the illumination $L_S$ in the narrow wavelength band $\lambda_S$, for example, and produces fluorescence with light intensity according to its own fluorescence efficiency (the ratio of the light intensity of fluorescence to the light intensity of illumination). Similarly, the other fluorescence material is excited by the illumination $L_L$ in the narrow wavelength band $\lambda_L$, for example, and produces fluorescence with light intensity according to its own fluorescence efficiency.

These two types of fluorescence are introduced to the camera 24 of the observation system (21–24) described above. A fluorescence image of the sample 20 based on the two types of fluorescence is shot by the camera 24 and captured as a fluorescence picture of the sample 20. At this point, if the two types of fluorescence differ in light intensity, the fluorescence picture of the sample 20 may be extremely hard to observe, containing a mixture of brighter images and dimmer images. Besides, it is difficult to obtain a picture appropriate for fluorescent observation.

Next, description will be given of the method for adjusting the light intensities of the two illuminations $L_S$ and $L_L$ for the sample 20 to be irradiated with by using the epi-illumination apparatus (11–19) of the present embodiment to equalize the light intensities of the fluorescence occurring from the respective fluorescence materials of the sample 20. The adjustments to the light intensities of the illuminations $L_S$ and $L_L$ are effected by operating the driving unit 15a to slide the light intensity balance filter 15 in the one direction (A).

For ease of explanation, the following description will focus only on the component in the narrow wavelength band $\lambda_S$ (hereinafter, referred to as "illumination $L_{0S}$") and the component in the narrow wavelength band $\lambda_L$ (hereinafter, referred to as "illumination $L_{0L}$") out of the illumination incident on the light intensity balance filter 15. Similarly, out of the illumination $L_1$ having passed through the light intensity balance filter 15, the description will focus only on the component in the narrow wavelength band $\lambda_S$ (hereinafter, referred to as "illumination $L_{1S}$") and the component in the narrow wavelength band $\lambda_L$ (hereinafter, referred to as "illumination $L_{1L}$"). This is because the components in the wavelength bands other than the narrow wavelength bands $\lambda_S$ and $\lambda_L$ do not reach the sample 20, being blocked in the process of transmission through the excitation filter 18 (FIG. 4).

Incidentally, the illumination $L_{0S}$ in the narrow wavelength band $\lambda_S$ becomes the illumination $L_{1S}$ through the light intensity balance filter 15, and becomes the illumination $L_S$ through the excitation filter 18 to impinge on the sample 20. Similarly, the illumination $L_{0L}$ in the narrow wavelength band $\lambda_L$ becomes the illumination $L_{1L}$ through the light intensity balance filter 15, and becomes the illumination $L_L$ through the excitation filter 18 to impinge on the sample 20.

Moreover, for ease of explanation, the illuminations $L_{0S}$ and $L_{0L}$ upon the incidence on the light intensity balance filter 15 shall each have a circular section as shown in FIG. 5(A) and the same size as that of the light source image 11a shown in FIG. 3.

Furthermore, the illuminations $L_{OS}$ and $L_{OL}$ shall have uniform intensity distributions in their sections as shown in FIG. 5(B). In this case, uniform intensity distributions are also seen in the sections of the illuminations $L_{1S}$ and $L_{1L}$ just transmitted through the light intensity balance filter 15 and in the sections of the illuminations $L_S$ and $L_L$ from the excitation filter 18 upon passing the pupil plane 21a of the objective 21.

As described above (see FIGS. 3(A) to 3(G)), when the light intensity balance filter 15 is slid in one direction (A), the position of the light source image 11a on the light intensity balance filter 15 varies relatively along the one direction (A). Then, the positions of sections of the illuminations $L_{OS}$ and $L_{OL}$ (see FIG. 5(A)) constituting part of the light source image 11a also vary relatively along the one direction (A).

As described above (see FIGS. 2(B) to 2(D)), the zones 31–33 of the light intensity balance filter 15 differ from each other in spectral characteristics. Here, description will be given of the spectral characteristics of the zones 31–33, focusing only on the illuminations $L_{OS}$ and $L_{OL}$ (narrow wavelength bands $\lambda_S$ and $\lambda_L$).

The zone 31 (FIG. 2(B)) transmits the illumination $L_{OS}$ in the narrow band of shorter wavelength $\lambda_S$ and blocks the illumination $L_{OL}$ in the narrow band of longer wavelength $\lambda_L$. The zone 32 (FIG. 2(C)) transmits both the illuminations $L_{OS}$ and $L_{OL}$. The zone 33 (FIG. 2(D)) blocks the illumination $L_{OS}$ and transmits the illumination $L_{OL}$. Hereinafter, the zone 31 will be referred to as "short wave transmission zone 31", the zone 32 as "full transmission zone 32", and the zone 33 as "long wave transmission zone 33" when necessary.

Here, the light intensity balance filter 15 is slid to vary the positions of sections of the illuminations $L_{OS}$ and $L_{OL}$ relatively, along the one direction (A) (see FIGS. 3(A) to 3(G)). For example, when the entire sections of the illuminations $L_{OS}$ and $L_{OL}$ fall within the full transmission zone 32 as in FIG. 3(D), the illuminations $L_{OS}$ and $L_{OL}$ are both transmitted through the light intensity balance filter 15 as they are.

Figure 6A:
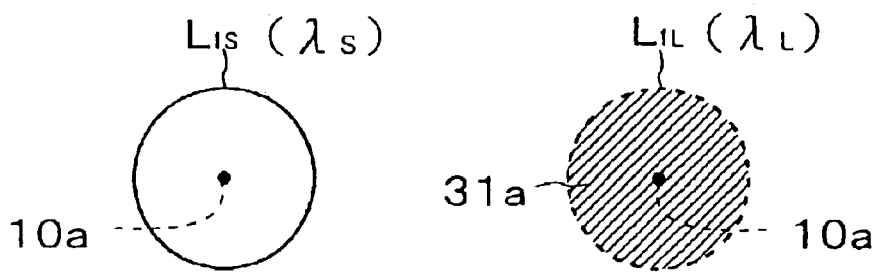
FIG. 6(A) is a diagram for explaining the method of adjusting balance in light intensity by the epi-illumination apparatus (11–19)
Figure 6B:
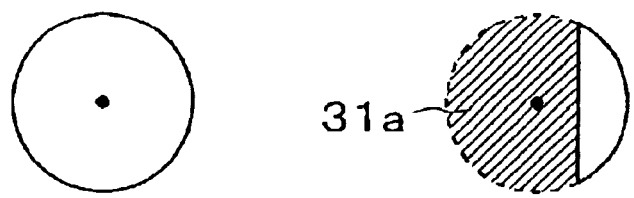
FIG. 6(B) is a diagram for explaining the same adjusting method as that of FIG. 6(A)
Figure 6C:
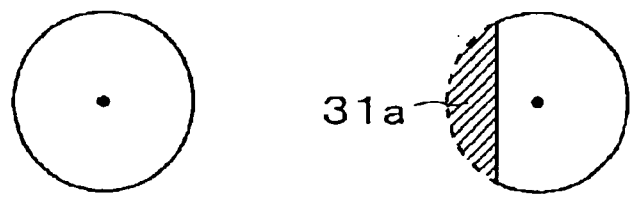
FIG. 6(C) is a diagram for explaining the same adjusting method as that of FIG. 6(A)
Figure 6D:
FIG. 6(D) is a diagram for explaining the same adjusting method as that of FIG. 6(A)

In this case, both the illuminations $L_{1S}$ and $L_{1L}$ just transmitted through the light intensity balance filter 15 are maintained circular in section as shown in FIG. 6(D). Hence, the illuminations $L_S$ and $L_L$ from the excitation filter 18 pass the pupil plane 21a of the objective 21 with their sections maintained circular. Then, the sample 20 is irradiated with the illuminations $L_S$ and $L_L$ each having a maximum light intensity.

The maximum light intensities of the illuminations $L_S$ and $L_L$ are constant light intensities that are generally determined by the products of the light intensities ($I_{OS}$ and $I_{OL}$) of the illuminations $L_{OS}$ and $L_{OL}$ incident on the light intensity balance filter 15 and the transmittances ($T_{OS}$ and $T_{OL}$) of the excitation filter 18 in the narrow wavelength bands $\lambda_S$ and $\lambda_L$. Then, the sample 20 is irradiated with the illuminations $L_S$ and $L_L$ in light intensity balance of generally ($I_{OS} \times T_{OS}$): ($I_{OL} \times T_{OL}$).

Figure 3B:
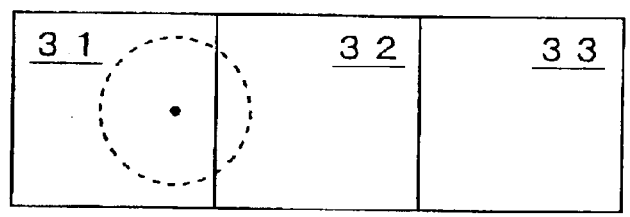
FIG. 3(B) is a diagram for explaining the same physical relationship as that of FIG. 3(A)
Figure 3C:
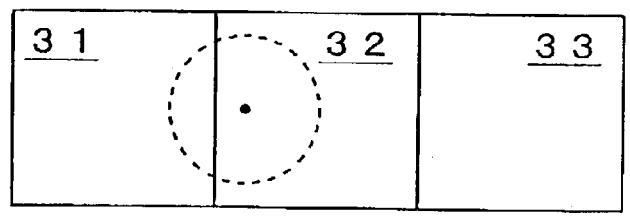
FIG. 3(C) is a diagram for explaining the same physical relationship as that of FIG. 3(A)
Figure 3D:
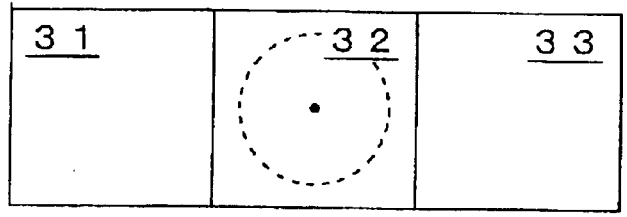
FIG. 3(D) is a diagram for explaining the same physical relationship as that of FIG. 3(A)

Now, if the illumination $L_L$ in the narrow band of longer wavelength $\lambda_L$ is to be dimmed, the light intensity balance filter 15 only has to be slid to "a side in which the short wave transmission zone 31 approaches the optical axis 10a (in the diagram, shown as plus side)" along the one direction (A) as shown in FIG. 3, and the boundary 34 between the short wave transmission zone 31 and the full transmission zone 32 only has to be set to intersect the sections of the illuminations $L_{OS}$ and $L_{OL}$ (for example, FIGS. 3(B) and 3(C)).

In the states of FIGS. 3(B) and 3(C), part of the sections of the illuminations $L_{OS}$ and $L_{OL}$ (left-hand portions in the diagram) lie in the short wave transmission zone 31. The other part (right-hand portions in the diagram) lie in the full transmission zone 32.

Here, the short-wave illumination $L_{OS}$ is transmitted through the light intensity balance filter 15 as it is. Consequently, the section of the illumination $L_{1S}$ just transmitted through the light intensity balance filter 15 (FIG. 6(B) and 6(C)) and the section of the illumination $L_S$ from the excitation filter 18 upon passing the pupil plane 21a of the objective 21 are both maintained circular. Then, the illumination $L_S$ irradiated onto the sample 20 remains the maximum light intensity.

Meanwhile, the portion of section of the long-wave illumination $L_{OL}$ (FIG. 3(B) and 3(C)) that falls within the full transmission zone 32 passes through the light intensity balance filter 15, whereas the portion that falls within the short wave transmission zone 31 is blocked. The section of the illumination $L_{1L}$ just transmitted through the light intensity balance filter 15 (FIGS. 6(B) and 6(C)) thus has a non-circular shape, lacking the portion 31a (hatched portion) which overlaps the short wave transmission zone 31.

Consequently, the section of the illumination $L_L$ from the excitation filter 18 is also shaped as those in FIGS. 6(B) and 6(C) when it passes through the pupil plane 21a of the objective 21. Then, the sample 20 is irradiated with the illumination $L_L$ having a light intensity lower than the maximum light intensity.

Here, the dimming ratio can be expressed as $S_L/S_{max}$, where $S_{max}$ is the area of the circular section of the illumination $L_{1L}$ as in FIG. 6(D) and $S_L$ is the area of the portion 31a overlapping the short wave transmission zone 31 (FIGS. 6(B) and 6(C)). This is because the intensity distributions in the respective sections are defined to be uniform as described above.

Consequently, when the boundary 34 between the short wave transmission zone 31 and the full transmission zone 32 of the light intensity balance filter 15 is set to intersect the sections of the illuminations $L_{OS}$ and $L_{OL}$ (FIGS. 3(B) and 3(C)), it is possible to dim the long-wave illumination $L_L$ alone while maintaining the short-wave illumination $L_S$ at its maximum light intensity. The sample 20 is irradiated with the illuminations $L_S$ and $L_L$ in light intensity balance of generally ($I_{OS} \times T_{OS}$): ($I_{OL} \times T_{OL} \times (1-S_L/S_{max})$).

Incidentally, in the state where the entire sections of the illuminations $L_{OS}$ and $L_{OL}$ fall within the short wave transmission zone 31 (FIG. 3(A)), the long-wave illumination $L_L$ can be blocked completely while the short-wave illumination $L_S$ is maintained at its maximum light intensity.

On the contrary, if the illumination $L_S$ in the narrow band of shorter wavelength $\lambda_S$ is to be dimmed, the light intensity balance filter 15 only has to be slid to "a side in which the long wave transmission zone 33 approaches the optical axis 10a (in the diagram, shown as minus side)" along the one direction (A) as shown in FIG. 3, and the boundary 35 between the full transmission zone 32 and the long wave transmission zone 33 only has to be set to intersect the sections of the illuminations $L_{OS}$ and $L_{OL}$ (for example, FIGS. 3(E) and 3(F)).

In the states of FIGS. 3(E) and 3(F), part of the sections of the illuminations $L_{OS}$ and $L_{OL}$ (left-hand portions in the diagram) lie in the full transmission zone 32. The other part (right-hand portions in the diagram) lie in the long wave transmission zone 33.

Here, the long-wave illumination $L_{OL}$ is transmitted through the light intensity balance filter 15 as it is. Consequently, the section of the illumination $L_{1L}$ just transmitted through the light intensity balance filter 15 (FIGS. 6(E) and 6(F)) and the section of the illumination $L_L$ from the excitation filter 18 upon passing the pupil plane 21a of the objective 21 are both maintained circular. Then, the illumination $L_L$ irradiated onto the sample 20 remains the maximum light intensity.

Meanwhile, the portion of section of the short-wave illumination $L_{OS}$ (FIGS. 3(E) and 3(F)) that falls within the full transmission zone 32 passes through the light intensity balance filter 15, whereas the portion that falls within the long wave transmission zone 33 is blocked. The section of the illumination $L_{1S}$ just transmitted through the light intensity balance filter 15 (FIGS. 6(E) and 6(F)) thus has a non-circular shape, lacking the portion 33a (hatched portion) which overlaps the long wave transmission zone 33.

Figure 6E:
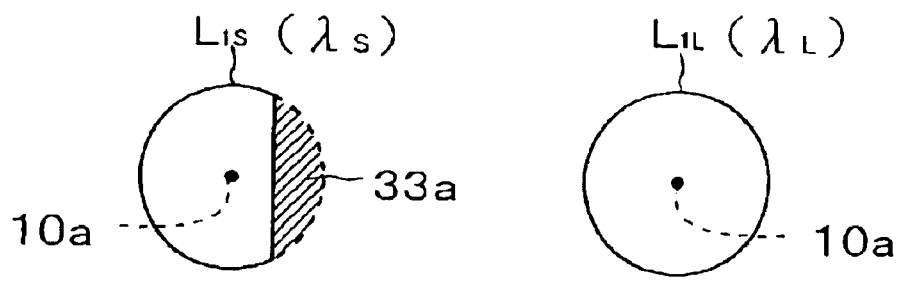
FIG. 6(E) is a diagram for explaining the same adjusting method as that of FIG. 6(A)
Figure 6F:
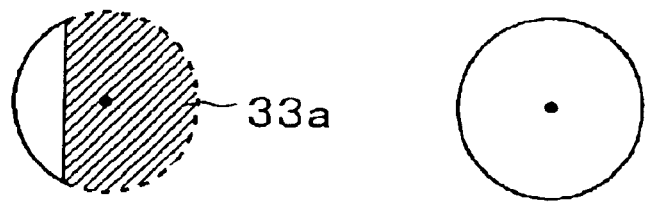
FIG. 6(F) is a diagram for explaining the same adjusting method as that of FIG. 6(A)
Figure 6G:
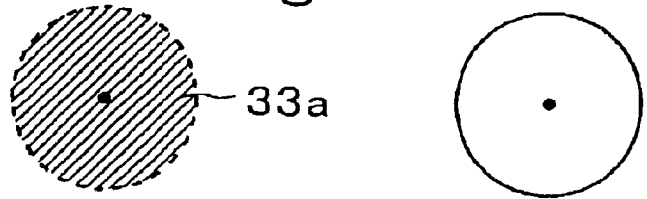
FIG. 6(G) is a diagram for explaining the same adjusting method as that of FIG. 6(A)

Hence, the section of the illumination $L_S$ from the excitation filter 18 is also shaped as those in FIGS. 6(E) and 6(F) when it passes through the pupil plane 21a of the objective 21. Then, the sample 20 is irradiated with the illumination $L_S$ having a light intensity lower than the maximum light intensity.

Here, the dimming ratio can be expressed as $S_S$/Smax, where Smax is the area of the circular section of the illumination $L_{1S}$ as in FIG. 6(D) and $S_S$ is the area of the portion 33a overlapping the long wave transmission zone 33 (FIGS. 6(E) and 6(F)). Again, this is because the intensity distributions in the respective sections are defined to be uniform as described above.

Consequently, when the boundary 35 between the long wave transmission zone 33 and the full transmission zone 32 of the light intensity balance filter 15 is set to intersect the sections of the illuminations $L_{OS}$ and $L_{OL}$ (FIGS. 3(E) and 3(F)), it is possible to dim the short-wave illumination $L_S$ alone while maintaining the long-wave illumination $L_L$ at its maximum light intensity. The sample 20 is irradiated with the illuminations $L_S$ and $L_L$ in light intensity balance of generally $(I_{OS} \times T_{OS} \times (1-S_S/Smax)):(I_{OL} \times T_{OL})$.

Incidentally, in the state where the entire sections of the illuminations $L_{OS}$ and $L_{OL}$ fall within the long wave transmission zone 33 (FIG. 3(G)), the short-wave illumination $L_S$ can be blocked completely while the long-wave illumination $L_L$ is maintained at its maximum light intensity.

As described above, in the epi-illumination apparatus (11–19) of the present embodiment, the areas of the sections of the two illuminations $L_S$ and $L_L$ ((Smax–$S_L$) or (Smax–$S_S$)) upon passing the pupil plane 21a of the objective 21 can be adjusted with respect to each of the narrow wavelength bands $\lambda_S$ and $\lambda_L$ independently, by simply sliding the light intensity balance filter 15 in the one direction (A). Then, the light intensities of the illuminations $L_S$ and $L_L$ can be reduced as much as the reduction in areas of sections. The light intensities of the illuminations $L_S$ and $L_L$ are proportional to the areas ((Smax–$S_L$) or (Smax–$S_S$)) on the pupil plane 21a.

That is, in the epi-illumination apparatus (11–19) of the present embodiment, the balance in light intensity between the illuminations $L_S$ and $L_L$ to be irradiated onto the sample 20 can be easily adjusted over a wide range by simply sliding the light intensity balance filter 15 in the one direction (A).

Moreover, in the present embodiment, it is possible to dim either one of the illuminations $L_S$ and $L_L$ while maintaining the other at the maximum light intensity. Which to dim, the long-wave illumination $L_L$ or the short-wave illumination $L_S$, can be determined by which side the light intensity balance filter 15 is slid to (plus side or minus side). The amount of dimming can be adjusted continuously according to the position of the light intensity balance filter 15.

Furthermore, in the present embodiment, the short wave transmission zone 31 (FIG. 2(B)) of the light intensity balance filter 15 blocks the illumination $L_{OL}$ in the narrow band of longer wavelength $\lambda_L$. The long wave transmission zone 33 (FIG. 2(D)) blocks the illumination $L_{OS}$ in the narrow band of shorter wavelength $\lambda_S$. Thus, the balance in light intensity between the illuminations $L_S$ and $L_L$ to be irradiated onto the sample 20 can be adjusted over a particularly wide range.

In actual usage, for example, the fluorescence picture captured by the camera 24 is observed on a monitor or through an eyepiece (not shown) while the light intensity balance filter 15 is slid to a position where the fluorescence picture of the sample 20 is in best brightness balance. Then, the operation of the light intensity balance filter 15 is ended.

Thus, according to the epi-illumination apparatus (11–19) of the present embodiment, the light intensity balance filter 15 only has to be slid in the one direction (A) so that the balance in light intensity between the two illuminations $L_1$ and $L_2$ for the sample 20 to be irradiated with can be adjusted easily to equalize the light intensities of the fluorescence occurring from the respective fluorescence materials in the sample 20.

As a result, the fluorescence picture of the sample 20 captured by the camera 24 includes two types of fluorescence images pertaining to different regions of the sample 20 both in appropriate brightness. This allows favorable fluorescent observation. Besides, the picture appropriate for fluorescent observation can be obtained easily.

In addition, even when the excitation filter 18 is replaced with one intended for two other wavelength bands, the light intensity balance filter 15 need not be replaced as long as short-wave one out of the two wavelength bands falls near or below the foregoing narrow wavelength band $\lambda_S$ and long-wave one falls near or above the foregoing narrow wavelength band $\lambda_L$.

That is, arbitrary combinations of fluorescence materials can be coped with flexibly (improved wavelength applicability) for continuous adjustments in the light intensity balance between the illuminations $L_1$ and $L_2$, without replacing the light intensity balance filter 15. This results in simpler operation, inexpensive configuration, and improved versatility.

Furthermore, in the epi-illumination apparatus (11–19) of the present embodiment, the light intensity balance filter 15 is arranged near the reference plane generally conjugated with the pupil plane 21a of the objective 21. Thus, the field of view of the sample 20 is prevented from deteriorations in optical characteristics (such as uneven illumination). That is, the field of view of the sample 20 can be illuminated uniformly with the illuminations $L_S$ and $L_L$, respectively, in the narrow wavelength bands $\lambda_S$ and $\lambda_L$. It is therefore possible to perform fluorescent observation with high precision even in the case where the balance in light intensity between the illuminations $L_S$ and $L_L$ is adjusted continuously.

Besides, in the epi-illumination apparatus (11–19) of the present embodiment, the mechanism for adjusting the balance in light intensity has no more than the configuration of sliding a single light intensity balance filter 1S in the one direction (A), which achieves space saving.

Modified Example of First Embodiment

The foregoing embodiment has dealt with the case where the light intensity balance filter 15 has the three zones 31, 32, and 33 which are arranged along the one direction (A) as shown in FIG. 2(A). However, the present invention is not limited thereto. The number of zones of the light intensity balance filter may be two, four, or over.

For example, when the light intensity balance filter is composed of two zones, the possible combinations include: (1) a short wave transmission zone and a full transmission zone; (2) a long wave transmission zone and a full transmission zone; and (3) a short wave transmission zone and a long wave transmission zone.

In the case of (1) above, the balance in light intensity between the illuminations $L_S$ and $L_L$ can be adjusted by maintaining the short-wave illumination $L_S$ at its maximum light intensity and dimming the long-wave illumination $L_L$. In the case of (2) above, the balance in light intensity between the illuminations $L_S$ and $L_L$ can be adjusted by maintaining the long-wave illumination $L_L$ at its maximum light intensity and dimming the short-wave illumination $L_S$. Since the fluorescence occurring from the sample 20 is weak, it is preferable that either one of the two zones is a full transmission zone.

Figure 7A:
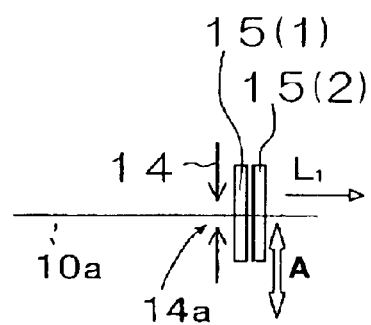
FIG. 7(A) is a diagram for explaining an epi-illumination apparatus having two light intensity balance filters 15(1) and 15(2)

Moreover, in the foregoing embodiment, a single light intensity balance filter 15 is arranged near the reference plane generally conjugated with the pupil plane 21a of the objective 21. Nevertheless, two light intensity balance filters 15(1) and 15(2) may be closely arranged as shown in FIG. 7(A). This configuration is effective when the excitation filter is configured to transmit illumination in three different narrow wavelength bands $\lambda_S$, $\lambda_C$, and $\lambda_L$. The light intensity balance filters 15(1) and 15(2) can be slid by the driving unit 15a independently.

Figure 7B:
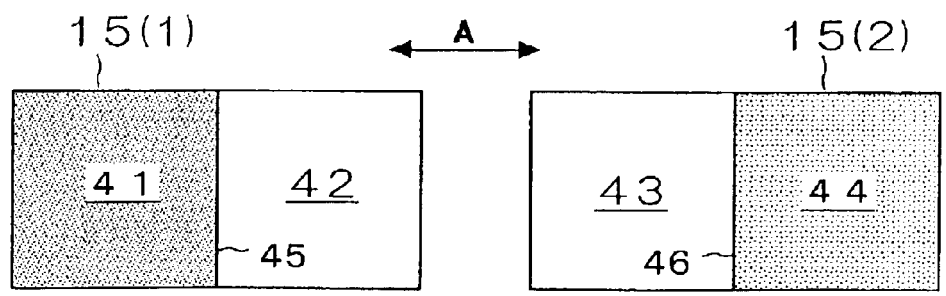
FIG. 7(B) is a diagram for explaining zones 41 and 42 of the light intensity balance filter 15(1) and zones 43 and 44 of the light intensity balance filter 15(2)
Figure 7C:
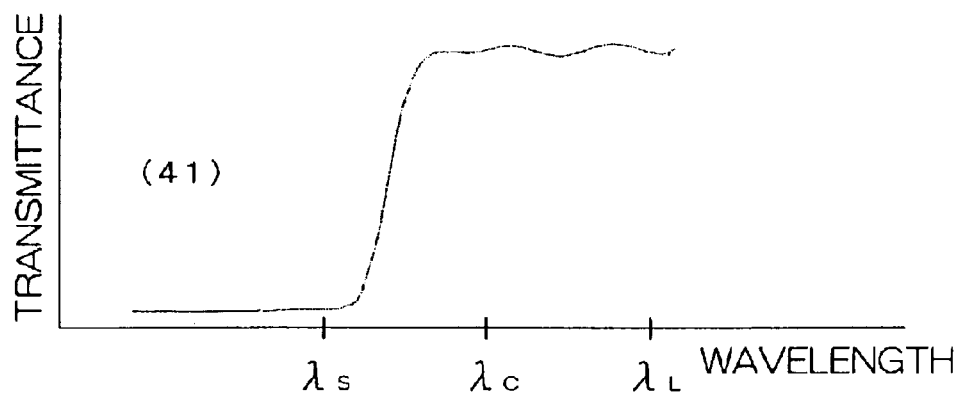
FIG. 7(C) is a diagram for explaining the spectral characteristics of the zone 41 of the light intensity balance filter 15(1)

As shown in FIG. 7(B), one light intensity balance filter 15(1) has two zones 41 and 42 which are arranged along the one direction (A). The zone 41 has the same spectral characteristics as those of the long wave transmission zone 33 described above. That is, as shown in FIG. 7(C), a critical wavelength is established between the narrow wavelength bands $\lambda_S$ and $\lambda_C$ so as to transmit a wavelength band longer than the critical wavelength (the side including the narrow wavelength bands $\lambda_C$ and $\lambda_L$) and block a band of shorter wavelength (the side including the narrow wavelength band $\lambda_S$). The zone 42 has the same spectral characteristics as those of the full transmission zone 32 described above.

Figure 7D:
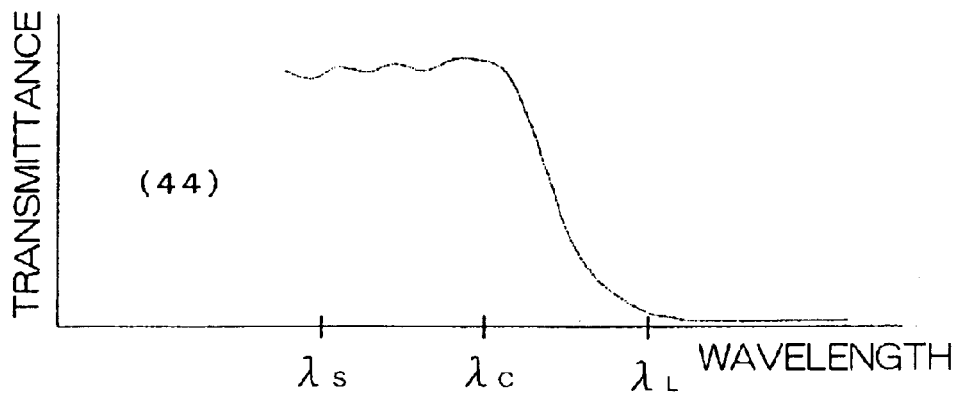
FIG. 7(D) is a diagram for explaining the spectral characteristics of the zone 44 of the light intensity balance filter 15(2)

As shown in FIG. 7(B), the other light intensity balance filter 15(2) has two zones 43 and 44 which are arranged along the one direction (A). The zone 43 has the same spectral characteristics as those of the full transmission zone 32 described above. The zone 44 has the same spectral characteristics as those of the short wave transmission zone 31 described above. That is, as shown in FIG. 7(D), a critical wavelength is established between the narrow wavelength bands $\lambda_C$ and $\lambda_L$ to transmit a wavelength band shorter than the critical wavelength (the side including the narrow wavelength bands $\lambda_S$ and $\lambda_C$) and block a band of longer wavelength (the side including the narrow wavelength band $\lambda_L$).

In this case, the one light intensity balance filter 15(1) can maintain the illuminations in the narrow wavelength bands $\lambda_C$ and $\lambda_L$ at their maximum light intensities and dim the illumination in the narrow band of shorter wavelength $\lambda_S$ as with the case (2) above. The other light intensity balance filter 15(2) can maintain the illuminations in the narrow wavelength bands $\lambda_S$ and $\lambda_C$ at their maximum light intensities and dim the illumination in the narrow band of longer wavelength $\lambda_L$ as with the case (1) above.

Consequently, the light intensity balance filters 15(1) and 15(2) can be slid independently in the one direction (A) so that the illumination in the narrow band of central wavelength $\lambda_C$ is maintained at its maximum light intensity while the illumination in the narrow band of shorter wavelength $\lambda_S$ and the illumination in the narrow band of longer wavelength $\lambda_L$ are dimmed independently. As a result, the balance in light intensity among the illuminations in the three different narrow wavelength bands $\lambda_S$, $\lambda_C$, and $\lambda_L$ can be adjusted continuously.

The present invention is also applicable to the case of performing fluorescent observation of a sample 20 that is marked with four or more fluorescence materials. In this case, the number of light intensity balance filters only has to be increased as described above.

The direction of arrangement of the plurality of zones on the light intensity balance filter is not limited to the one direction (A) as described above. That is, the plurality of zones may be arranged not exclusively along the direction perpendicular to the optical axis 10a but any direction as long as across the optical axis 10a. Moreover, the plurality of zones may be arranged not exclusively along one direction but two directions across the optical axis 10a. In this case, the light intensity balance filter is preferably rendered movable in the two directions.

The foregoing embodiment has dealt with the case where the full transmission zone of the light intensity balance filter is an unmodified zone of the glass substrate with no coating. However, this full transmission zone may be a hollow. In this case, the glass substrate constituting the other zones is preferably reduced in thickness. The reason is to make a difference between the optical paths through the hollow and the glass substrate small.

In the foregoing embodiment, the light intensity balance filter is made of an interference filter. Nevertheless, it may be replaced with colored glass filters having transmittance characteristics necessary for the respective zones. Two colored glass filters may be arranged adjacently with their end faces joined to each other.

The foregoing embodiment has dealt with the case where the illuminations $L_{OS}$ and $L_{OL}$ are incident on the light intensity balance filter with uniform intensity distributions over the sections thereof. However, the present invention is also applicable when the intensity distributions are uneven. In this case, not only the areas ($S_L$ and $S_S$) of the overlapping portions 31a and 33a shown in FIG. 6 but also the intensity distributions of the illuminations $L_{OS}$ and $L_{OL}$ in the overlapping portions 31a and 33a contribute to the determination of the dimming ratio of either one of the two illuminations $L_S$ and $L_L$.

The foregoing embodiment has dealt with the case where the boundaries 34 and 35 (FIG. 2(A)) in the light intensity balance filter are orthogonal to the direction of movement of the light intensity balance filter (for example, the one direction (A)). However, the present invention is not limited thereto. For example, as in the light intensity balance filter 55 shown in FIG. 8, the boundary 53 between zones 51 and 52 may be formed in an aslant direction to the direction of movement (the one direction (A)).

Given that the boundary 53 extends at an angle of θ from the one direction (A), the more decreased this angle θ is, the lower the ratio of the actual displacement $\delta_2$ of the boundary 53 to the displacement $\delta_1$ of the light intensity balance filter 55 in the one direction (A) (=$\delta_2/\delta_1$) can be. Consequently, delicate adjustments can be made to the displacement $\delta_2$ of the boundary 53 easily without adjusting the displacement $\delta_1$ of the light intensity balance filter 55 severely. That is, fine adjustments to the balance in light intensity between the illuminations $L_S$ and $L_L$ can be made by simple manual operations.

Such a configuration is particularly effective when the light source image on the light intensity balance filter 55 is not circular as the light source image 11a of FIG. 3 but oblong (for example, peanut-shaped) in the direction perpendicular to the direction of movement of the light intensity balance filter 55 (the one direction (A)), since fine adjustments to the balance in light intensity between the illuminations $L_S$ and $L_L$ are facilitated further.

The foregoing embodiment has dealt with the case where the short wave transmission zones 31 and 44 have such spectral characteristics as block the longer waves completely (transmittance≈0%). Nevertheless, the present invention is also applicable with spectral characteristics such that the transmittance gradually decreases from short waves to long waves as shown in FIG. 9, and spectral characteristics such that the transmittance varies stepwise between short waves and long waves. The same holds for the long wave transmission zones 33 and 41.

In the case of the light intensity balance filter that includes the combination of a short wave transmission zone (or long wave transmission zone) and a full transmission zone (or hollow) having the configuration described above, sliding the light intensity filter causes no change in the area of the section of illumination on the pupil plane 21a of the objective 21 ((Smax-$S_L$) or (Smax-$S_S$)).

Instead, the section of the illumination on the pupil plane 21a undergoes a change in the intensity distribution of the long wave transmission zone (or short wave transmission zone). In this case, the balance in light intensity between the illuminations $L_S$ and $L_L$ can be adjusted according to variations in the intensity distributions on the pupil plane 21a. The balance in light intensity between the illuminations $L_S$ and $L_L$ may be adjusted by varying both the areas of the sections on the pupil plane 21a and the intensity distributions over the sections.

The foregoing embodiment has dealt with the case where the light source means includes the light source 11, the collector lens 12, and the imaging lens 13. Such light source means (11–13) may be replaced with a light guide. When the light guide is used, it is preferably arranged with its beam emergent face near the aperture stop 14. The light source means (11–13) may also be replaced with a small-sized semiconductor laser, a light-emitting diode, or the like.

The foregoing embodiment has dealt with the case where the aperture stop 14 and the light intensity balance filter 15 are arranged in this order. However, the physical relationship between the aperture stop 14 and the light intensity balance filter 15 may be inverted.

In the foregoing embodiment, the dichroic mirror 19 is arranged on the intersection of the epi-illumination apparatus (11–19) and the observation system (21–24). The dichroic mirror 19, however, may be replaced with a beam splitter.

In addition, when a plurality of light intensity balance filters 15 are prepared for respective types of excitation wavelength bands $\lambda_S$ and $\lambda_L$, they can be replaced depending on fluorescent observations (types of excitation wavelengths) with excellent usability.

The foregoing embodiment has dealt with the case where the epi-illumination apparatus (11–19) is incorporated into the fluorescence microscope 10. Nevertheless, the epi-illumination apparatus (11–19) may also be incorporated into other fluorescence measuring systems aside from the fluorescence microscope.

Second Embodiment

Figure 10:
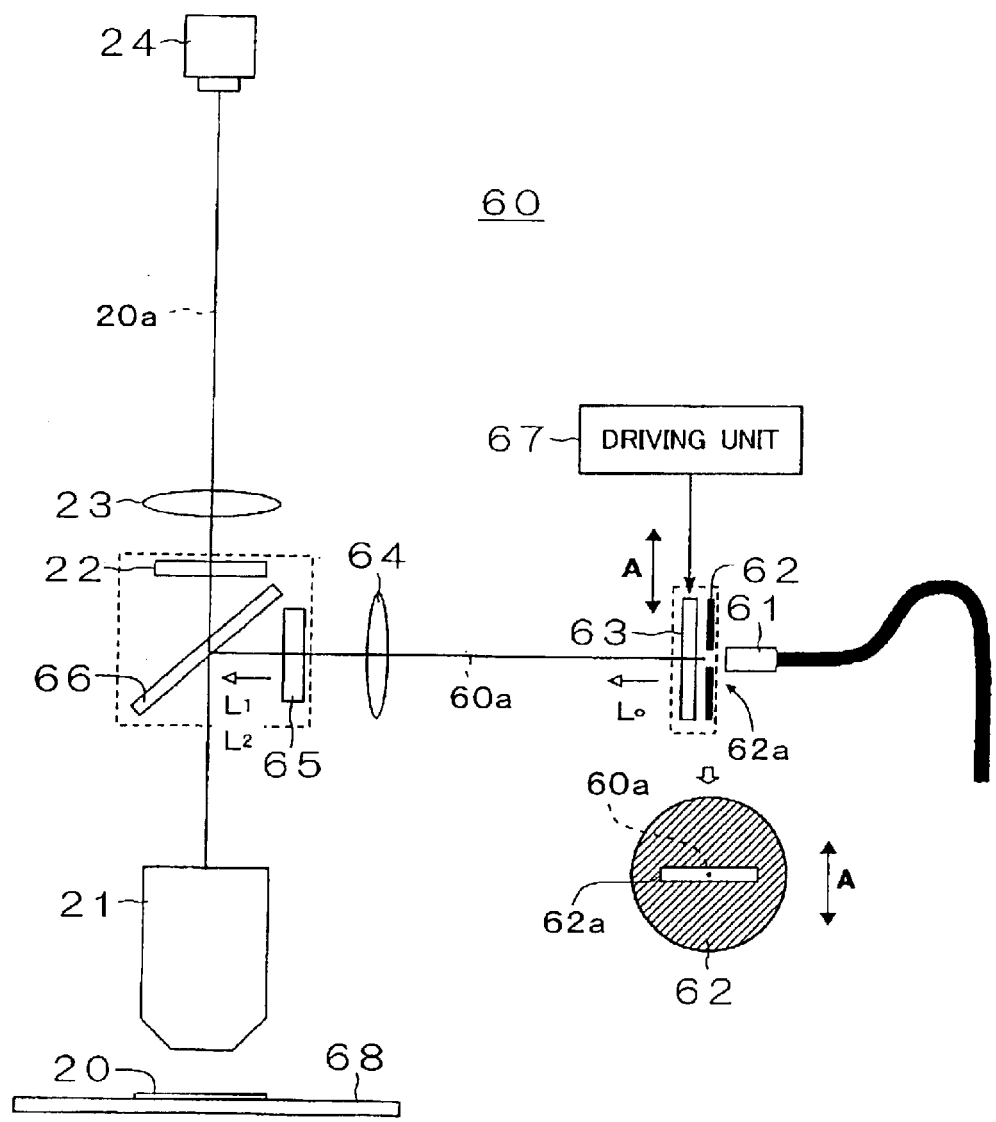
FIG. 10 is an overall block diagram of a fluorescence microscope 60 and its epi-illumination apparatus (61–67)

A second embodiment of the present invention will deal with an example of an epi-illumination apparatus (61–67) which is built in a fluorescence microscope 60 to be used in fluorescent observation of a sample 20 and illuminates the sample 20 as shown in FIG. 10.

The fluorescence microscope 60 has an observation system (21–24) aside from the epi-illumination apparatus (61–67) for fluorescent observation. The configuration of the observation system (21–24) is the same as the fluorescence microscope 10 described above (see FIG. 1). Description thereof will thus be omitted.

The sample 20 is, for example, a living sample (such as DNA and protein) marked with two types of fluorescence materials, and is placed on a stage 68. When the sample 20 is illuminated by the epi-illumination apparatus (61–67), it produces two types of fluorescence in all directions (to be detailed later).

When the sample 20 is under fluorescent observation, the two types of fluorescence occurring from the sample 20 are collected to the shooting surface of the camera 24 through the objective 21, a beam splitter 66 to be described later, the barrier filter 22, and the imaging lens 23. Here, a fluorescence image of the sample 20 based on the two types of fluorescence is formed on the shooting surface of the camera 24. The fluorescence image on the shooting surface is shot by the camera 24 and captured as a fluorescence picture of the sample 20.

Next, description will be given of the epi-illumination apparatus (61–67) of the present embodiment.

The epi-illumination apparatus (61–67) includes a light source 61, an aperture stop 62, a variable spectral filter 63, a relay lens 64, an excitation filter 65, and a beam splitter 66, which are arranged in order along an optical axis 60a. In addition, a driving unit 67 is connected to the variable spectral filter 63.

The epi-illumination apparatus (61–67) is built in between the objective 21 and the barrier filter 22 of the observation system (21–24) with the optical axis 60a orthogonal to the optical axis 20a of the observation system (21–24). Here, the beam splitter 66 of the epi-illumination apparatus (61–67) falls on the optical axis 20a.

When the sample 20 is under fluorescent observation, the illumination from the light source 61 is generally transmitted through the aperture stop 62, the variable spectral filter 63, the relay lens 64, and the excitation filter 65, reflected by the beam splitter 66, and introduced onto the sample 20 through the objective 21.

In the epi-illumination apparatus (61–67) of the present embodiment, the relay lens 64 defines a reference plane generally conjugated with the pupil plane of the objective 21. The light source 61, the aperture stop 62, and the variable spectral filter 63 are closely arranged in the vicinity of the reference plane.

The light source 61 is a mercury, xenon, or other multiwavelength light source which is lead by a light guide, for example. The light source 61 emits illumination such as ultraviolet rays and visible light to the aperture stop 62 on the side of the objective 21. The aperture stop 62 is an optical element arranged stationary in the optical path of the relay lens 62. This aperture stop 62 has an opening 62a of slit shape (rectangular) which falls on the optical axis 60a of the epi-illumination apparatus (61–67). The longitudinal direction of the opening 62a is perpendicular to the plane of the diagram.

Thus, the light from the light source 61 passes through the opening 62a in the aperture stop 62 to show a predetermined section corresponding to the opening 62a near the reference plane mentioned above (the plane generally conjugated with the pupil plane of the objective 21). This section has the same shape (similar shape) as that of the opening 62a.

The illumination having passed through the opening 62a of the aperture stop 62 is then incident on the variable spectral filter 63. Here, an image of the opening 62a of the aperture stop 62 (hereinafter, referred to as "slit image") is formed on the surface of the variable spectral filter 63 facing the aperture stop 62. Since the aperture stop 62 and the variable spectral filter 63 are sufficiently close to each other, the slit image on the variable spectral filter 63 will have the same shape (similar shape) as that of the opening 62a.

In the epi-illumination apparatus (61–67) of the present embodiment, the variable spectral filter 63 is connected with the driving unit 67. This driving unit 67 can be manually operated to slide the variable spectral filter 63 along one direction (A). The one direction (A) is perpendicular to the direction of the optical axis 60a and the longitudinal direction of the slit image, crossing the optical path of the illumination.

Figure 11A:
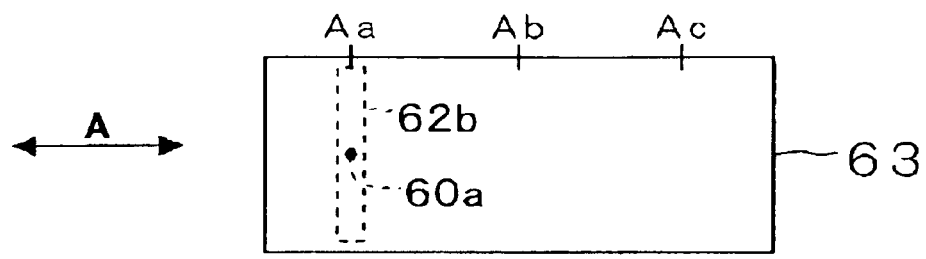
FIG. 11(A) is a diagram for explaining the physical relationship between a variable spectral filter 63 and a slit image 62b.
Figure 11B:
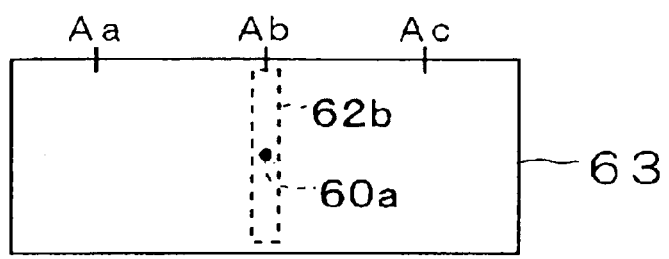
FIG. 11(B) is a diagram for explaining the same physical relationship as that of FIG. 11(A)
Figure 11C:
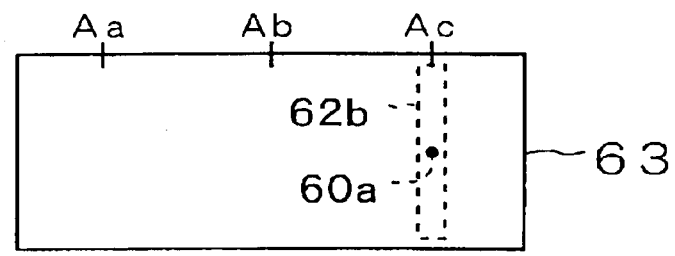
FIG. 11(C) is a diagram for explaining the same physical relationship as that of FIG. 11(A)

When the driving unit 67 is operated to slide the variable spectral filter 63 in the one direction (A), the position of incidence of the illumination from the aperture stop 62 on the variable spectral filter 63 varies relatively along the one direction (A). FIGS. 11(A) to 11(C) are views of the aperture stop 62 and the variable spectral filter 63 as taken in the direction of the optical axis 60a. Then, as shown in FIGS. 11(A) to 11(C), the position of the slit image 62b on the variable spectral filter 63 also varies relatively along the one direction (A).

Now, the variable spectral filter 63 is an optical element provided to adjust the spectrum of the illumination that forms the slit image 62b. It transmits the spectrum-adjusted illumination toward the relay lens 64. That is, the variable spectral filter 63 is situated in the optical path of the illumination.

Moreover, the variable spectral filter 63 is an interference filter fabricated by applying a coating to one of the surfaces of a glass substrate (the surface facing the aperture stop 62). The coated zone of the variable spectral filter 63 is rendered greater than the opening 62a in the aperture stop 62 (that is, the foregoing slit image 62b) as to the one direction (A). The coating varies in thickness gradually along the one direction (A).

Figure 11D:
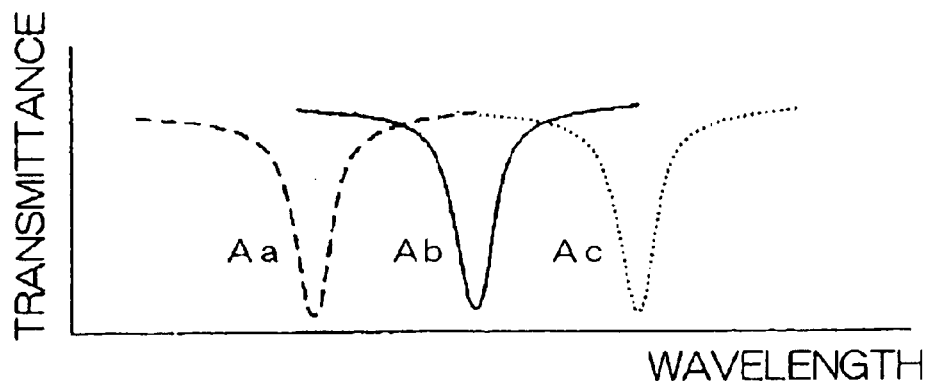
FIG. 11(D) is a chart for explaining the spectral characteristics (notch-like) of the variable spectral filter 63.

As shown in FIG. 11(D), the variable spectral filter 63 has notch-like spectral characteristics of blocking a specific narrow wavelength band by absorption or reflection and of transmitting the rest of wavelength bands. It is also configured so that the specific narrow wavelength band varies continuously across the coated zone along the one direction (A). In short, the variable spectral filter 63 varies in spectral characteristics continuously along the one direction (A).

"Aa" to "Ac" in FIG. 11(D) are examples of the spectral characteristics of the variable spectral filter 63 at the positions Aa to Ac shown in FIGS. 11(A)–11(C), respectively. As can be seen from the correspondence between FIGS. 11(A)–11(C) and FIG. 11(D), the specific narrow wavelength band of the variable spectral filter 63 shows continuous changes such that the wavelength increases gradually from one end of the variable spectral filter 63 to the other. The specific narrow wavelength band of the variable spectral filter 63 varies continuously over a range as wide as from short waves (such as 350 nm) to long waves (such as 650 nm), for example.

Thus, when the variable spectral filter 63 is slid in the one direction (A) as described above and the slit image 62b is in the state of FIG. 11(A) where it is formed in the position Aa of the variable spectral filter 63, illumination $L_0$ having a spectrum corresponding to the spectral characteristics "Aa" in FIG. 11(D) is transmitted through the variable spectral filter 63.

Similarly, when the slit image 62b is in the states of FIGS. 11(B) and 11(C) where it is formed in the positions Ab and Ac of the variable spectral filter 63, illumination $L_0$ having spectra corresponding to the spectral characteristics of "Ab" and "Ac" in FIG. 11(D) is transmitted through the variable spectral filter 63, respectively.

That is, by sliding the variable spectral filter 63 in the one direction (A), the spectrum of the illumination $L_0$ to be transmitted through the variable spectral filter 63 can be adjusted (selected) easily in accordance with the continuous distribution of the spectral characteristics (specific narrow wavelength band) of the variable spectral filter 63. The spectral width of the illumination $L_0$ to be transmitted through the variable spectral filter 63 is determined by the width of the opening 62a in the aperture stop 62.

The illumination $L_0$ having been transmitted through the foregoing variable spectral filter 63 and adjusted in spectrum is then incident on the relay lens 64 (FIG. 10). The relay lens 64, as described previously, is an optical system for defining the reference plane generally conjugated with the pupil plane of the objective 21. The illumination $L_0$ from the variable spectral filter 63 which is arranged near the reference plane is thus collected to the pupil plane of the objective 21 by the action of the relay lens 64.

Figure 12:
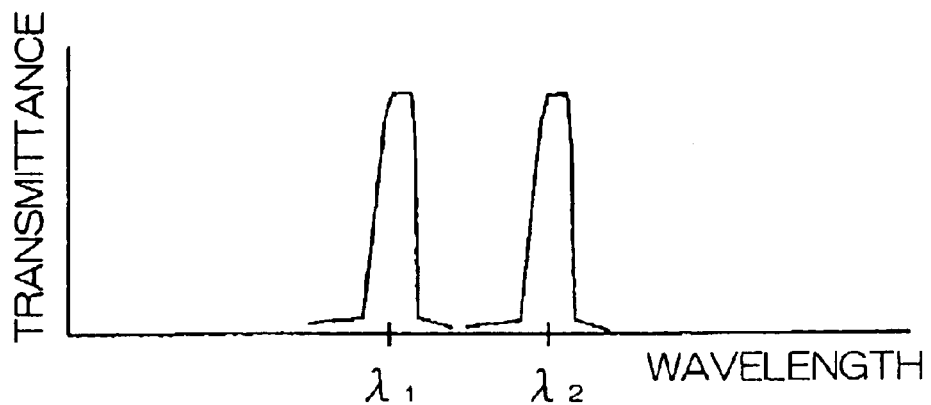
FIG. 12 is a chart for explaining the spectral characteristics of an excitation filter 65.

Note that before the illumination transmitted through the relay lens 64 is introduced onto the optical axis 20a of the observation system (21–24), or while it proceeds on the optical axis 60a of the epi-illumination apparatus (61–67), it is transmitted through the excitation filter 65. This excitation filter 65 is a filter for transmitting illumination in two predetermined, different narrow wavelength bands $\lambda_1$ and $\lambda_2$ as shown in FIG. 12.

Incidentally, one of the two narrow wavelength bands $\lambda_1$ and $\lambda_2$ of the excitation filter 65 is a narrow wavelength band suitable for the excitation of either one of the fluorescence materials in the sample 20. The other of the two narrow wavelength bands $\lambda_1$ and $\lambda_2$ is one suitable for the excitation of the other fluorescence material in the sample 20.

The illumination incident on the excitation filter 65 has the same spectrum as that of the illumination $L_0$ having been transmitted through the variable spectral filter 63. That is, the relay lens 64 causes no change in the spectrum of the illumination. Thus, the excitation filter 65 simultaneously extracts the two narrow wavelength bands $\lambda_1$ and $\lambda_2$ alone (FIG. 12) from the wavelength band of the illumination $L_0$ (see FIG. 11(D)).

Consequently, the illumination transmitted through the excitation filter 65 contains two illuminations $L_1$ and $L_2$ in the different narrow wavelength bands $\lambda_1$ and $\lambda_2$. The two illuminations $L_1$ and $L_2$ are part of the illumination $L_0$ that is incident on the excitation filter 65. Then, the two illuminations $L_1$ and $L_2$ are collected to the pupil plane of the objective 21, and irradiated onto the sample 20 after passing through the objective 21.

In the sample 20, one of the fluorescence materials is excited by the illumination $L_1$ in the narrow wavelength band $\lambda_1$, for example, and produces fluorescence with light intensity corresponding to its own fluorescence efficiency (the ratio of the light intensity of fluorescence to the light intensity of illumination). Similarly, the other fluorescence material is excited by the illumination $L_2$ in the narrow wavelength band $\lambda_2$, for example, and produces fluorescence with light intensity corresponding to its own fluorescence efficiency.

These two types of fluorescence are introduced to the camera 24 of the observation system (21–24) mentioned above. The fluorescence image of the sample 20 based on the two types of fluorescence is shot by the camera 24 and captured as a fluorescence picture of the sample 20. Here, if the two types of fluorescence differ in light intensity, the fluorescence picture of the sample 20 may be extremely hard to observe, containing a mixture of brighter images and dimmer images. Besides, it is difficult to obtain a picture appropriate for fluorescent observation.

Next, description will be given of the method for independently adjusting the light intensities of the two illuminations $L_1$ and $L_2$ for the sample 20 to be irradiated with by using the epi-illumination apparatus (61–67) of the present embodiment to equalize the light intensities of the fluorescence occurring from the respective fluorescence materials of the sample 20.

As described above, in the epi-illumination apparatus (61–67) of the present embodiment, the spectrum of the illumination $L_0$ to be transmitted through the variable spectral filter 63 can be adjusted easily by sliding the variable spectral filter 63 in the one direction (A).

Figure 13A:
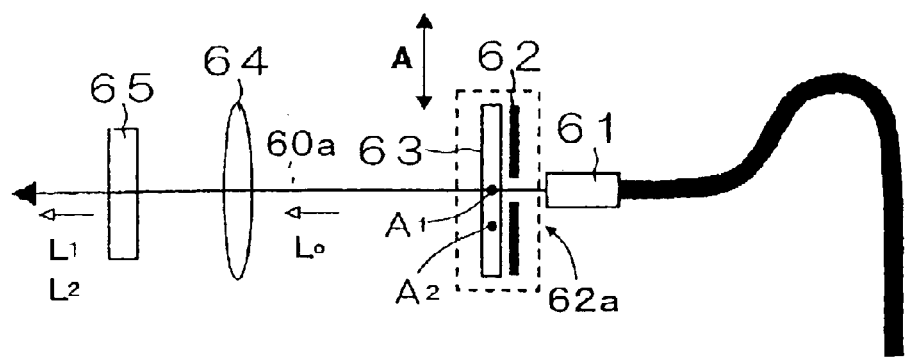
FIG. 13(A) is a diagram for explaining the method of adjusting balance in light intensity by the epi-illumination apparatus (61–67) (using the position $A_1$ of the variable spectral filter 63)
Figure 13B:
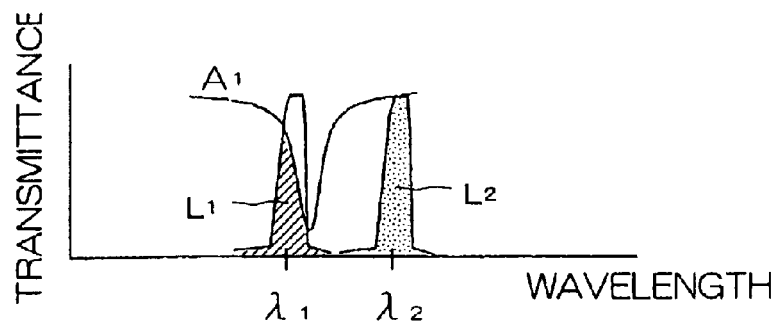
FIG. 13(B) is a chart for explaining dimming in the state of FIG. 13(A)

Thus, when the slit image of the opening 62a is formed on the position $A_1$ of the variable spectral filter 63 as shown in FIG. 13(A), for example, the variable spectral filter 63 transmits the illumination $L_0$ having a spectrum corresponding to the spectral characteristics "$A_1$" of FIG. 13(B).

The spectral characteristics "$A_1$" of FIG. 13(B) are ones such that the narrow wavelength band thereof overlaps somewhat with one of the narrow wavelength bands, $\lambda_1$, of the excitation filter 65 but not with the other narrow wavelength band $\lambda_2$. Thus, between the two illuminations transmitted through the excitation filter 65, the illumination $L_1$ in the narrow wavelength band $\lambda_1$ is reduced in light intensity as shown by the diagonally hatched zone of FIG. 13(B). The illumination $L_2$ in the narrow wavelength band $\lambda_2$ is maintained at its maximum light intensity as shown by the dot-hatched zone.

Such a setting is effective when one of the fluorescence materials excitable by the illumination $L_1$ in the narrow wavelength band $\lambda_1$ has a fluorescence efficiency higher than that of the other fluorescence material excitable by the illumination $L_2$ in the narrow wavelength band $\lambda_2$.

Figure 14A:
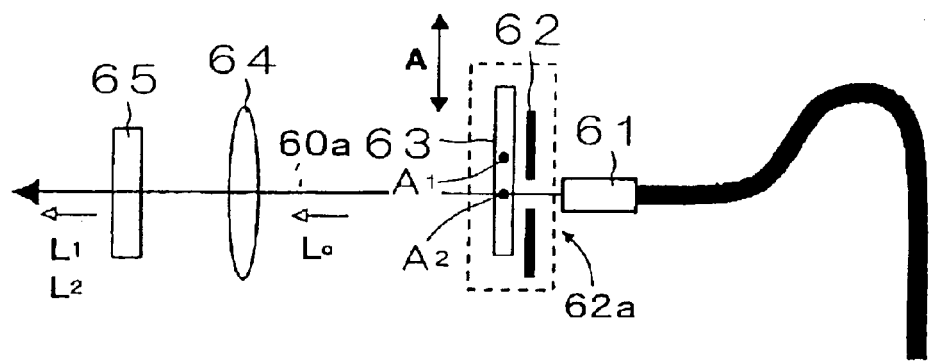
FIG. 14(A) is a diagram for explaining the method of adjusting balance in light intensity by the epi-illumination apparatus (61–67) (using the position $A_2$ of the variable spectral filter 63)
Figure 14B:
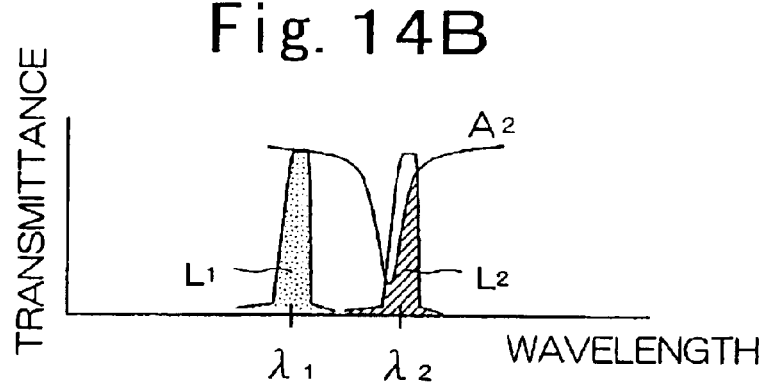
FIG. 14(B) is a chart for explaining dimming in the state of FIG. 14(A)

When the slit image of the opening 62a is formed on the position $A_2$ of the variable spectral filter 63 as shown in FIG. 14(A), for example, the variable spectral filter 63 transmits the illumination $L_0$ having a spectrum corresponding to the spectral characteristics "$A_2$" of FIG. 14(B).

The spectral characteristics "$A_2$" of FIG. 14(B) are ones such that the narrow wavelength band thereof overlaps somewhat with the other narrow wavelength band $\lambda_2$ of the excitation filter 65 but not with the one narrow wavelength band $\lambda_1$. Thus, between the two illuminations transmitted through the excitation filter 65, the illumination $L_2$ in the narrow wavelength band $\lambda_2$ is reduced in light intensity as shown by the diagonally hatched zone of FIG. 14(B). The illumination $L_1$ in the narrow wavelength band $\lambda_1$ is maintained at its maximum light intensity as shown by the dot-hatched zone.

Such a setting is effective when one of the fluorescence materials excitable by the illumination $L_1$ in the narrow wavelength band $\lambda_1$ has a fluorescence efficiency lower than that of the other fluorescence material excitable by the illumination $L_2$ in the narrow wavelength band $\lambda_2$.

According to the epi-illumination apparatus (61–67) of the present embodiment, the variable spectral filter 63 only has to be slid in the one direction (A) so that the balance in light intensity between the two illuminations $L_1$ and $L_2$ for the sample 20 to be irradiated with can be adjusted easily to equalize the light intensities of the fluorescence occurring from the respective fluorescence materials in the sample 20.

As a result, the fluorescence picture of the sample 20 captured by the camera 24 includes two types of fluorescence images pertaining to different regions of the sample 20 both in appropriate brightness. This allows favorable fluorescent observation. Besides, the picture appropriate for fluorescent observation can be obtained easily.

Moreover, in the epi-illumination apparatus (61–67) of the present embodiment, the specific narrow wavelength band of the variable spectral filter 63 varies continuously over a wide range (from 350 to 650 nm, for example). Thus, the balance in light intensity between the illuminations $L_1$ and $L_2$ can be adjusted continuously across a wide wavelength band by simply sliding the variable spectral filter 63 in the one direction (A).

Besides, the excitation filter 65 can be replaced with one having a different narrow wavelength band, without requiring the replacement of the variable spectral filter 63. That is, arbitrary combinations of fluorescence materials can be coped with flexibly for continuous adjustments in the light intensity balance between the illuminations $L_1$ and $L_2$, without replacing the variable spectral filter 63. This results in simpler operation, inexpensive configuration, and improved versatility.

Furthermore, in the epi-illumination apparatus (61–67) of the present embodiment, the variable spectral filter 63 is arranged near the reference plane generally conjugated with the pupil plane of the objective 21. Thus, the field of view of the sample 20 is prevented from deteriorations in optical characteristics (such as uneven illumination). It is therefore possible to conduct fluorescent observation with high precision even in the case where the balance in light intensity between the illuminations $L_1$ and $L_2$ is adjusted continuously.

Modified Example of Second Embodiment

Figure 15A:
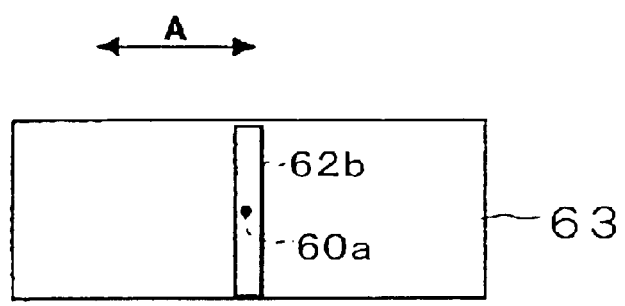
FIG. 15(A) is a diagram for explaining a state where an opening 62a of an aperture stop 62 is reduced in width with respect to the variable spectral filter 63.
Figure 16A:
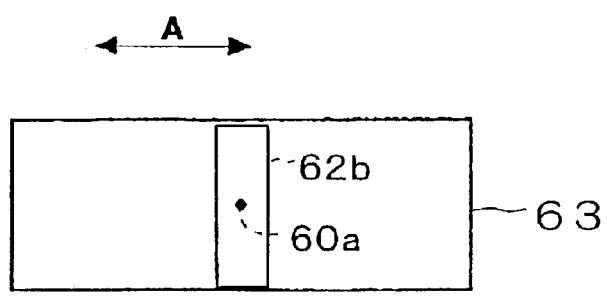
FIG. 16(A) is a diagram for explaining a state where the opening 62a of the aperture stop 62 is increased in width with respect to the variable spectral filter 63.

The foregoing embodiment has dealt with the case where the opening 62a in the aperture stop 62 has a constant width (dimension with respect to the one direction (A)). However, as shown in FIGS. 15(A) and 16(A), the opening 62a may be varied in width with the optical axis 60a at its center. Such changes can also be made easily through manual operations using the driving unit 67 (FIG. 10) mentioned above.

Figure 15B:
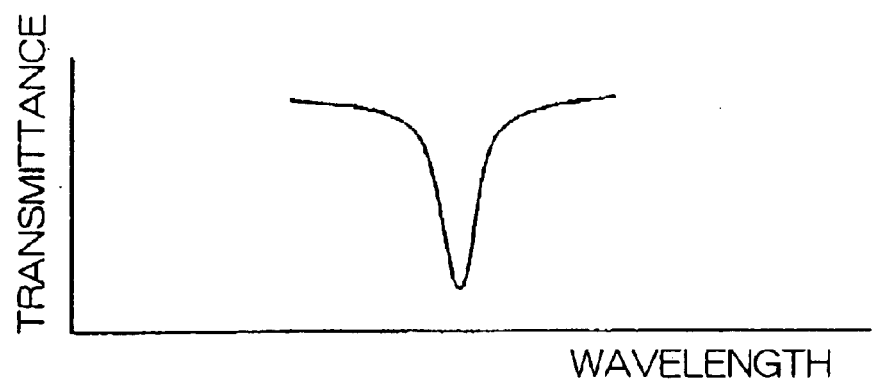
FIG. 15(B) is a chart for explaining the spectral characteristics of the variable spectral filter 63 in the state of FIG. 15(A)
Figure 16B:
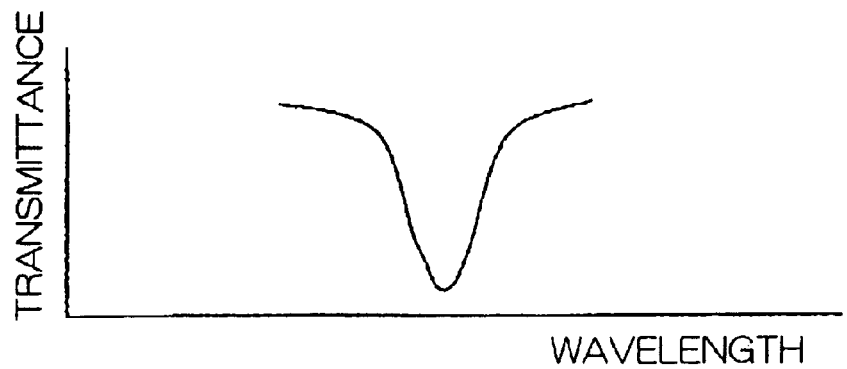
FIG. 16(B) is a chart for explaining the spectral characteristics of the variable spectral filter 63 in the state of FIG. 16(A)

In this case, as shown in FIGS. 15(B) and 16(B), the spectral width of the illumination Lo to be transmitted through the variable spectral filter 63 can be adjusted easily depending on the width of the opening 62a. The greater the width of the opening 62a is, the wider the spectral width of the illumination $L_0$ is. Then, the light intensities of the two illuminations $L_1$ and $L_2$ for the sample 20 to be irradiated with can be increased or decreased simultaneously.

Figure 17A:
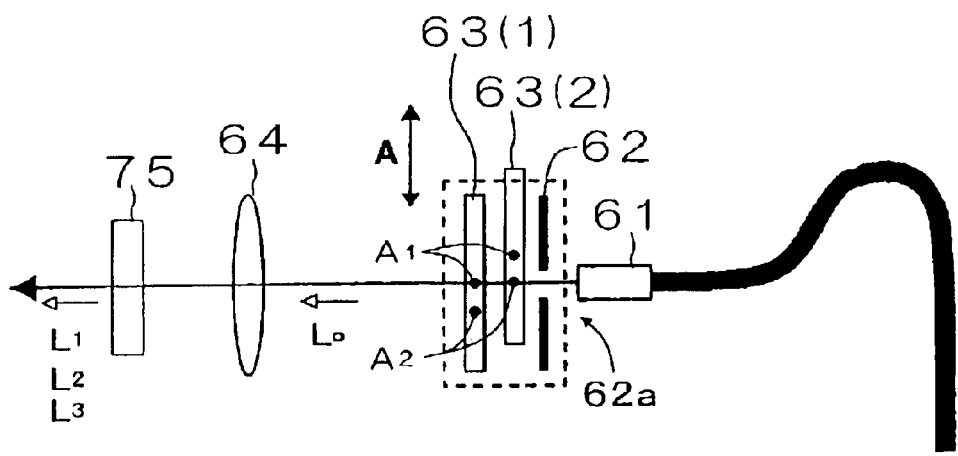
FIG. 17(A) is a diagram for explaining an epi-illumination apparatus having two variable spectral filters 63(1) and 63(2)

In the foregoing embodiment, a single variable spectral filter 63 is arranged near the reference plane generally conjugated with the pupil plane of the objective 21. Nevertheless, as shown in FIG. 17, two variable spectral filters 63(1) and 63(2) may be arranged when an excitation filter 75 is configured to transmit illumination in three different narrow wavelength bands $\lambda_1$, $\lambda_2$, and $\lambda_3$. The variable spectral filters 63(1) and 63(2) have the same spectral characteristics as those of the variable spectral filter 63 described above (see FIG. 11). The variable spectral filters 63(1) and 63(2) can be slid by the driving unit 67 independently.

In this case, sliding the variable spectral filters 63(1) and 63(2) independently in the one direction (A) allows such a setting that the slit image of the opening 62a in the aperture stop 62 is formed on the position $A_1$ of the variable spectral filter 63(1) and the position $A_2$ of the variable spectral filter 63(2) to be established.

Figure 17B:
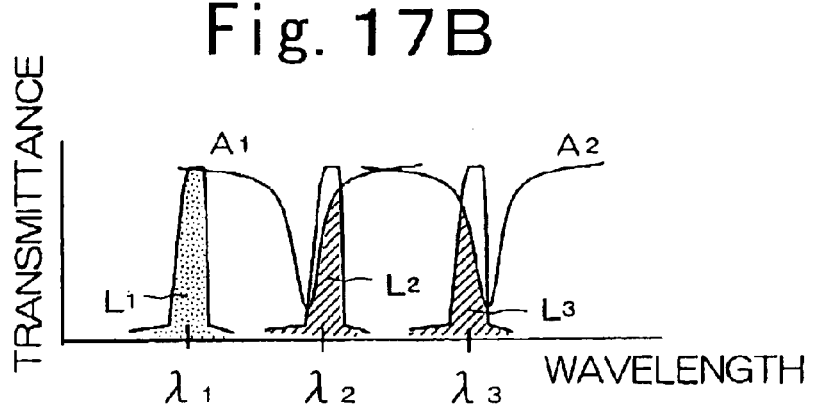
FIG. 17(B) is a chart for explaining dimming in the state of FIG. 17(A)

Here, as shown in FIG. 17(B), the following states of illumination can be established depending on the spectral characteristics "A₁" of the variable spectral filter 63(1) (characteristics overlapping somewhat with the narrow wavelength band $\lambda_2$ of the excitation filter 75) and the spectral characteristics "A₂" of the variable spectral filter 63(2) (characteristics overlapping somewhat with the narrow wavelength band $\lambda_3$ of the excitation filter 75).

That is, the illuminations $L_2$ and $L_3$ in the narrow wavelength bands $\lambda_2$ and $\lambda_3$ can be reduced in light intensity as shown by the diagonally hatched zones of FIG. 17(B) while the illumination $L_1$ in the narrow wavelength band $\lambda_1$ is maintained at its maximum light intensity as shown by the dot-hatched zone. Such configuration and setting are effective when the sample 20 is marked with three fluorescence materials, and one of the fluorescence materials excitable by the illumination $L_1$ in the narrow wavelength band $\lambda_1$ has a fluorescence efficiency lower than those of the fluorescence materials excitable by the illuminations $L_2$ and $L_3$ in the narrow wavelength bands $\lambda_2$ and $\lambda_3$.

The present invention is also applicable to the case of performing fluorescent observation of a sample 20 that is marked with four or more fluorescence materials. In this case, the number of variable spectral filters only has to be increased as described above.

Figure 18:
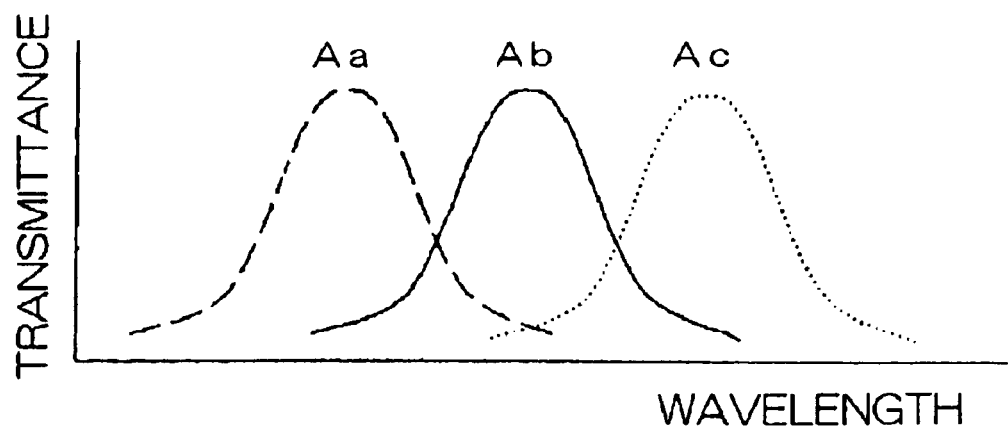
FIG. 18 is a chart for explaining the spectral characteristics (barrier-like) of another variable spectral filter.
Figure 19A:
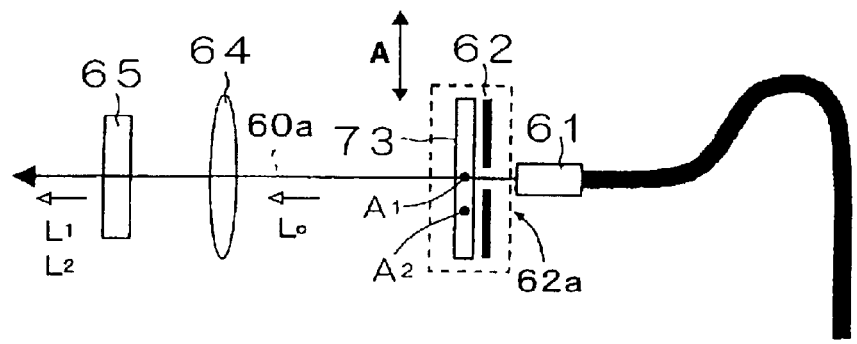
FIG. 19(A) is a diagram for explaining the method of adjusting balance in light intensity by an epi-illumination apparatus having a barrier filter (73) (using the position $A_1$ of the barrier filter)
Figure 19B:
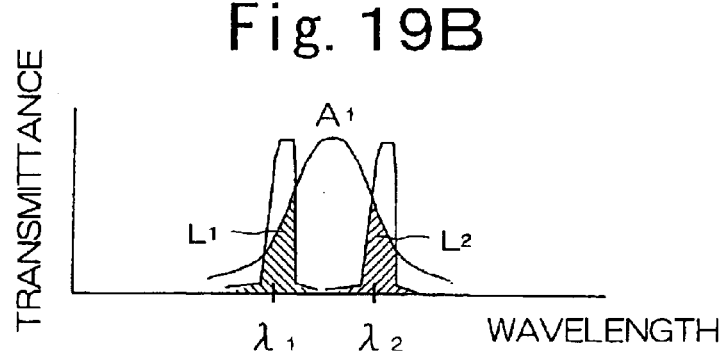
FIG. 19(B) is a chart for explaining dimming in the state of FIG. 19(A)
Figure 20A:
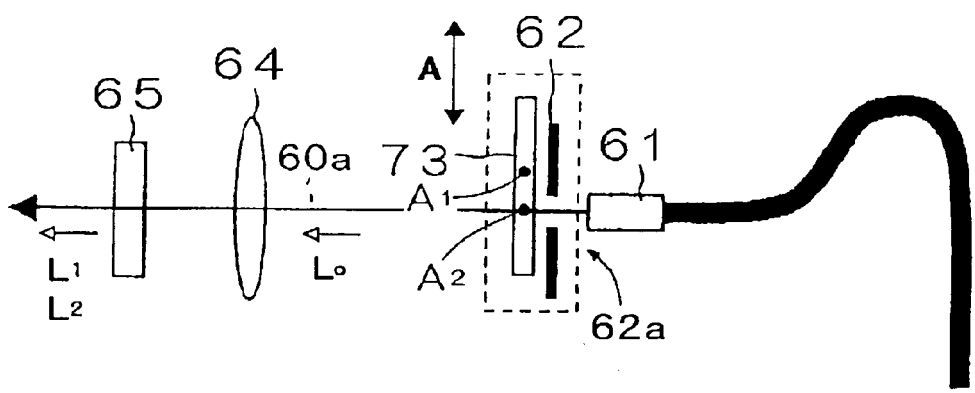
FIG. 20(A) is a diagram for explaining the method of adjusting balance in light intensity by the epi-illumination apparatus having the barrier filter (73) (using the position $A_2$ of the barrier filter)
Figure 20B:
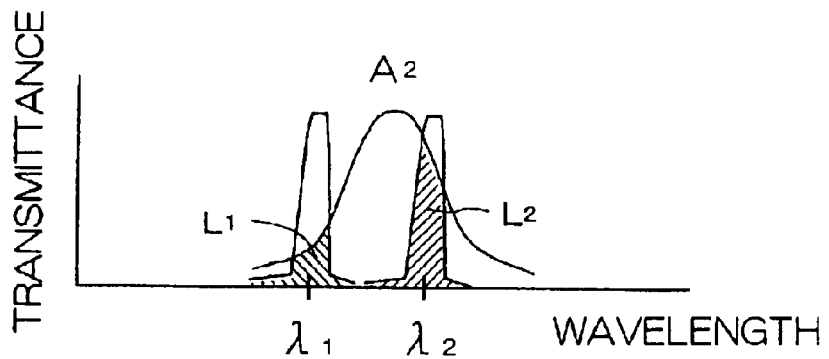
FIG. 20(B) is a chart for explaining dimming in the state of FIG. 20(A)

The foregoing embodiment has dealt with the variable spectral filter which has the notch-like spectral characteristics of blocking a specific narrow wavelength band and transmitting the rest. Nevertheless, as shown in FIG. 18, it is possible to use a variable spectral filter 73 (FIGS. 19 and 20) which has barrier-like spectral characteristics of transmitting a specific narrow wavelength band and blocking the rest.

Even in the case of using such a barrier filter, the variable spectral filter 73, as is the case with the foregoing notch filter, only has to be slid in the one direction (A) so that the balance in light intensity between the two illuminations $L_1$ and $L_2$ can be adjusted easily to equalize the light intensities of the fluorescence occurring from the respective fluorescence materials in the sample 20.

Moreover, the specific narrow wavelength band of the variable spectral filter 73 varies continuously over a wide range (from 350 to 650 nm, for example). Thus, the balance in light intensity between the illuminations $L_1$ and $L_2$ can be adjusted continuously across a wide wavelength band by simply sliding the variable spectral filter 73 in the one direction (A).

Besides, the excitation filter 65 can be replaced with one having a different narrow wavelength band, without requiring the replacement of the variable spectral filter 73. That is, arbitrary combinations of fluorescence materials can be coped with flexibly for continuous adjustments in the light intensity balance between the illuminations $L_1$ and $L_2$, without replacing the variable spectral filter 73. This results in simpler operation, inexpensive configuration, and improved versatility.

In addition, since the variable spectral filter 73 is arranged near the reference plane generally conjugated with the pupil plane of the objective 21, the field of view of the sample 20 is prevented from undergoing uneven illumination and the like. It is therefore possible to conduct fluorescent observation with high precision even in the case where the balance in light intensity between the illuminations $L_1$ and $L_2$ is adjusted continuously.

Figure 21A:
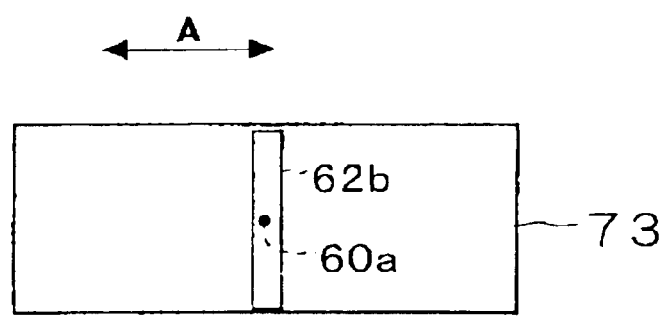
FIG. 21(A) is a diagram for explaining a state where the opening 62a of the aperture stop 62 is reduced in width with respect to the barrier filter (73)
Figure 21B:
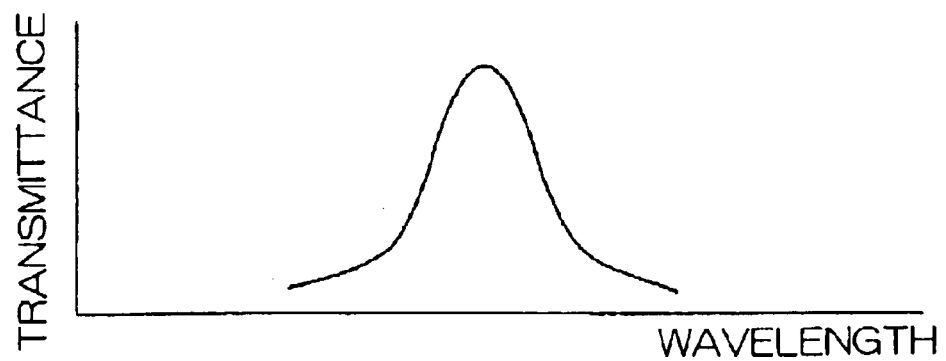
FIG. 21(B) is a chart for explaining the spectral characteristics of the barrier filter (73) in the state of FIG. 21(A)
Figure 22A:
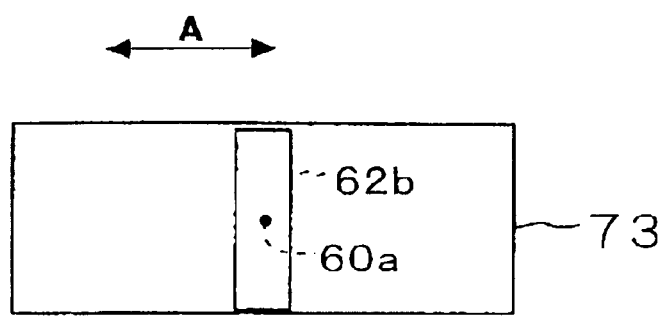
FIG. 22(A) is a diagram for explaining a state where the opening 62a of the aperture stop 62 is increased in width with respect to the barrier filter (73)
Figure 22B:
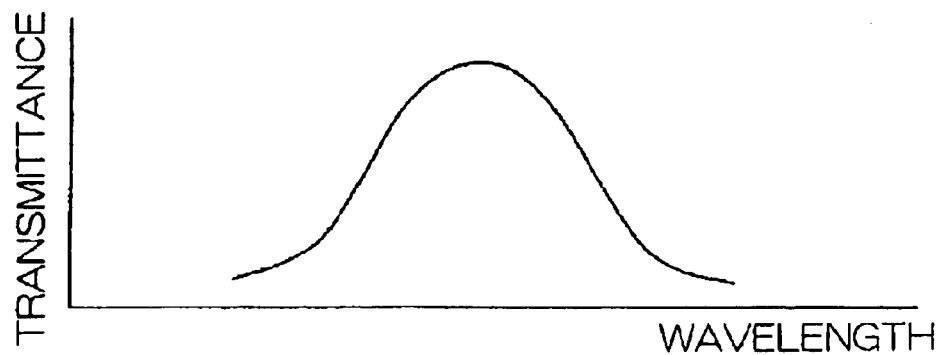
FIG. 22(B) is a chart for explaining the spectral characteristics of the barrier filter (73) in the state of FIG. 22(A)

Even with the variable spectral filter 73, the spectral width of the illumination $L_0$ to be transmitted through the variable spectral filter 73 can be adjusted easily as shown in FIGS. 21(B) and 22(B) by varying the width of the opening 62a with the optical axis 60a at its center as shown in FIGS. 21(A) and 22(A). The greater the width of the opening 62a is, the wider the spectral width of the illumination $L_0$ is. Then, the light intensities of the two illuminations $L_1$ and $L_2$ for the sample 20 to be irradiated with can be increased or decreased simultaneously.

Figure 23A:
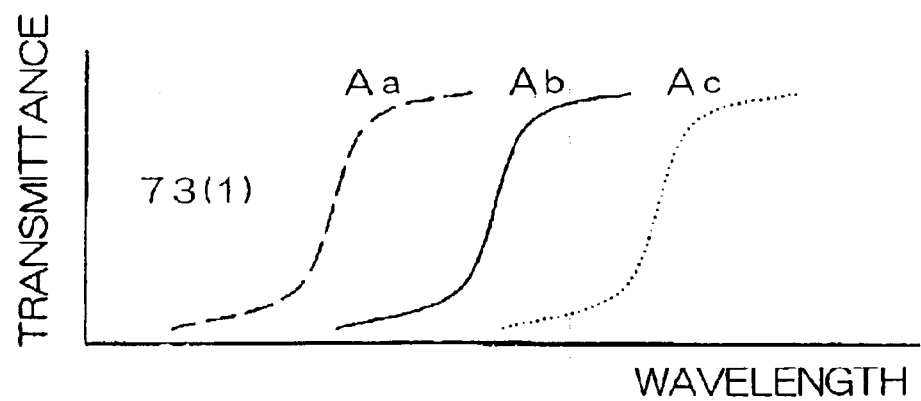
FIG. 23(A) is a chart for explaining the spectral characteristics (critical wavelength type) of another variable spectral filter 73(1)
Figure 23B:
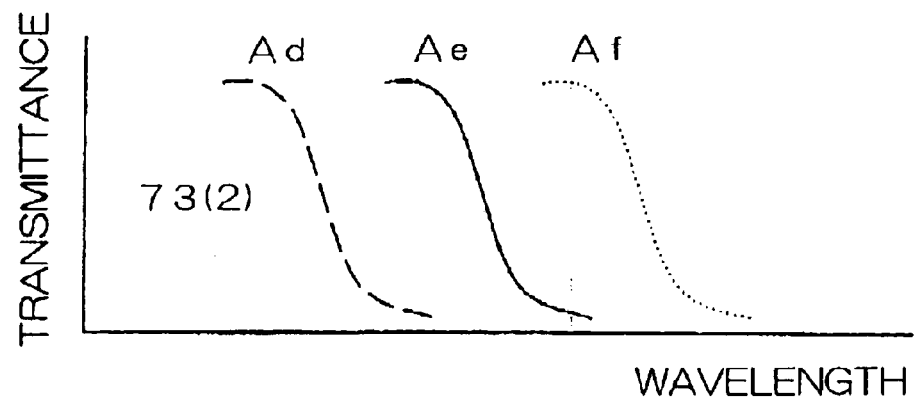
FIG. 23(B) is a chart for explaining the spectral characteristics (critical wavelength type) of another variable spectral filter 73(2)
Figure 24A:
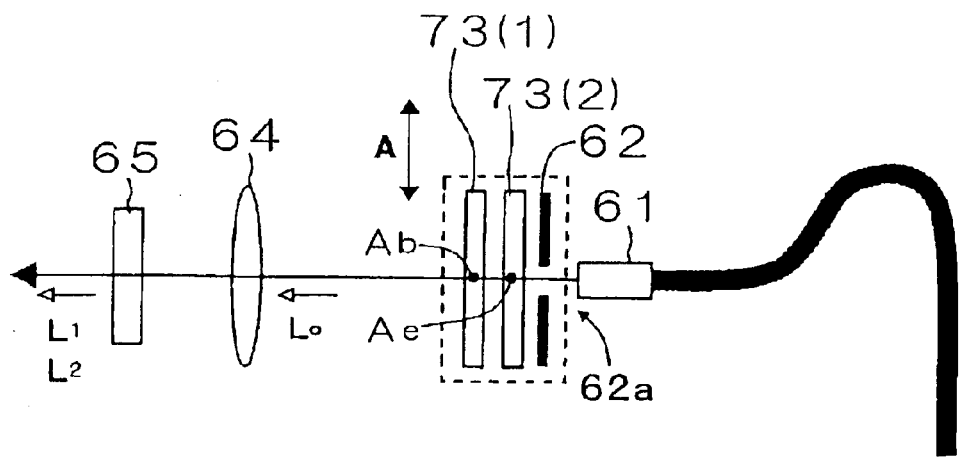
FIG. 24(A) is a diagram for explaining the method of adjusting balance in light intensity with the two variable spectral filters 73(1) and 73(2)
Figure 24B:
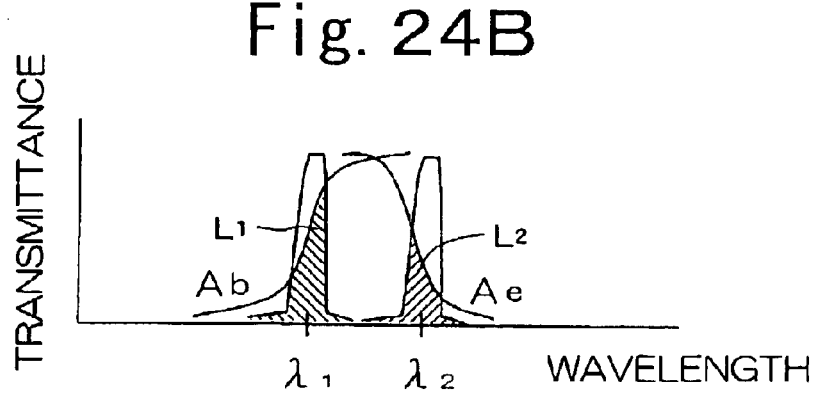
FIG. 24(B) is a chart for explaining dimming in the state of FIG. 24(A).

The foregoing embodiment has dealt with the case where the barrier-like spectral characteristics (see FIG. 18) are achieved by a single variable spectral filter 73. It is also possible to use a variable spectral filter 73(1) for transmitting waves longer than a certain critical wavelength as shown in FIG. 23(A) and a variable spectral filter 73(2) for transmitting waves shorter than a certain critical wavelength as shown in FIG. 23(B) in combination (FIG. 24).

Incidentally, the variable spectral filters 73(1) and 73(2) each are configured to vary in critical wavelength continuously along the one direction (A). The variable spectral filters 73(1) and 73(2) can be slid by the driving unit 67 independently. In this case, the same effects can also be obtained as with the single barrier filter (variable spectral filter 73) described above.

In the foregoing embodiment, the light source 61 is arranged near the reference plane generally conjugated with the pupil plane of the objective 21. This light source 61 may be replaced with a light source (such as a mercury lamp) and a condenser (collector lens, imaging lens) as those in FIG. 1. In this case, it is preferable that the condenser forms an arc image near the variable spectral filter.

The foregoing embodiment has dealt with the case where the light source 61, the aperture stop 62, and the variable spectral filter 63 are arranged in this order. Nevertheless, the physical relationship between the aperture stop 62 and the variable spectral filter 63 may be inverted.

The foregoing embodiment has dealt with a configuration example where the aperture stop 62 is arranged stationary and the variable spectral filter 63 is slid along the one direction (A). However, the present invention is not limited thereto. The variable spectral filter 63 may be arranged stationary while the aperture stop 62 is slid along the one direction (A). Both the variable spectral filter 63 and the aperture stop 62 may be slid (moved) relatively along the one direction (A).

In the foregoing embodiment, the beam splitter 66 is arranged on the intersection of the epi-illumination apparatus (61–67) and the observation system (21–24). Nevertheless, the beam splitter 66 may be replaced with a dichroic mirror. The dichroic mirror has spectral characteristics capable of reflecting illumination in a plurality of narrow wavelength bands transmitted through the excitation filter 65, 75 and transmitting a plurality of types of fluorescence occurring from the sample 20.

The foregoing embodiment has dealt with the case where the epi-illumination apparatus (61–67) is incorporated into the fluorescence microscope 60. Nevertheless, the epi-illumination apparatus (61–67) may also be incorporated into other fluorescence measuring systems aside from the fluorescence microscope.

The invention is not limited to the above embodiments and various modifications may be made without departing from the spirit and scope of the invention. Any improvement may be made in part or all of the components.

What is claimed is:

1. An epi-illumination apparatus for fluorescent observation, comprising:
    a light source for emitting illumination, being arranged on a predetermined optical axis;
    extracting means for extracting a plurality of narrow wavelength bands from a wavelength band of said illumination, said extracting means being arranged on said optical axis; an aperture stop arranged on said optical axis, on a plane generally conjugated with a pupil plane of an objective;

a filter having regions of different spectral transmission characteristics with respect to said plurality of narrow wavelength bands, said filter being arranged near said aperture stop on said optical axis; and adjusting means for adjusting light intensities of transmitted light from said filter in said plurality of narrow wavelength bands independently by moving said filter in a direction orthogonal to said optical axis, wherein said filter includes a plurality of zones adjacent to each other sectioned by one or more boundaries which cross the direction of movement of said filter, said spectral transmission characteristics of adjacent zones out of said plurality of zones differing from each other;

said adjusting means adjusts said light intensities independently by moving said filter so that said transmitted light varies in at least either areas of sections of light in said plurality of narrow wavelength bands or intensity distributions in said sections of said light;

said one or more boundaries of said plurality of zones of said filter are formed in an aslant direction to the direction of movement of said filter; and said plurality of zones are composed of only a short wave transmission zone and a long wave transmission zone.

2. A fluorescence microscope for use in fluorescent observation of a sample marked with a plurality of fluorescence materials, comprising:

the epi-illumination apparatus for fluorescent observation according to claim 1, and an imaging optical system for collecting fluorescence from said sample to form a fluorescence image of said sample, said imaging optical system including said objective.

3. An epi-illumination apparatus for fluorescent observation, comprising:

a light source for emitting illumination, being arranged on a predetermined optical axis;

extracting means for extracting a plurality of narrow wavelength bands from a wavelength band of said illumination, said extracting means being arranged on said optical axis;

an aperture stop arranged on said optical axis, on a plane generally conjugated with a pupil plane of an objective;

a filter having regions of different spectral transmission characteristics with respect to said plurality of narrow wavelength bands, said filter being arranged near said aperture stop on said optical axis; and adjusting means for adjusting light intensities of transmitted light from said filter in said plurality of narrow wavelength bands independently by moving said filter in a direction orthogonal to said optical axis, wherein at least the wavelength band of said spectral transmission characteristics of said filter vary continuously along the direction of movement of said filter; and said adjusting means adjusts said light intensities independently by moving said filter to vary said transmitted light in spectrum.

4. The epi-illumination apparatus for fluorescent observation according to claim 3, wherein said filter has notch-like spectral transmission characteristics capable of blocking a specific narrow wavelength band and transmitting the rest of wavelength bands, said specific narrow wavelength band varying continuously along the direction of movement.

5. A fluorescence microscope for use in fluorescent observation of a sample marked with a plurality of fluorescence materials, comprising:

the epi-illumination apparatus for fluorescent observation according to claim 4, and an imaging optical system for collecting fluorescence from said sample to form a fluorescence image of said sample, said imaging optical system including said objective.

6. The epi-illumination apparatus for fluorescent observation according to claim, wherein:

said aperture stop has an opening of variable size as to the direction of movement; and said adjusting means adjusts said light intensities independently by varying the size of said opening to vary said transmitted light in spectrum.

7. A fluorescence microscope for use in fluorescent observation of a sample marked with a plurality of fluorescence materials, comprising:

the epi-illumination apparatus for fluorescent observation according to claim 6, and an imaging optical system for collecting fluorescence from said sample to form a fluorescence image of said sample, said imaging optical system including said objective.

8. A fluorescence microscope for use in fluorescent observation of a sample marked with a plurality of fluorescence materials, comprising:

the epi-illumination apparatus for fluorescent observation according to claim 3, and an imaging optical system for collecting fluorescence from said sample to form a fluorescence image of said sample, said imaging optical system including said objective.

* * * * *

UNITED STATES PATENT AND TRADEMARK OFFICE
CERTIFICATE OF CORRECTION

PATENT NO. : 6,906,859 B2
APPLICATION NO. : 10/453660
DATED : June 14, 2005
INVENTOR(S) : Toshiaki Nihoshi et al.

It is certified that error appears in the above-identified patent and that said Letters Patent is hereby corrected as shown below:

Column 25, Line 33, (claim 2, line 5) after "claim 1" delete "," and insert - - ; - - therefor.
Column 26, Line 21, (claim 5, line 5) after "claim 4" delete "," and insert - - ; - - therefor.
Column 26, Line 27, (claim 6, line 2) after "claim 3" delete "," and insert - - ; - - therefor.
Column 26, Line 37, (claim 7, line 5) after "claim 6" delete "," and insert - - ; - - therefor.
Column 26, Line 46, (claim 8, line 5) after "claim 3" delete "," and insert - - ; - - therefor.

Signed and Sealed this

First Day of August, 2006

JON W. DUDAS
*Director of the United States Patent and Trademark Office*